United States Patent

Wong

[11] 4,334,284
[45] Jun. 8, 1982

[54] MULTIPLIER DECODING USING PARALLEL MQ REGISTER

[75] Inventor: Wilson T. C. Wong, Irvine, Calif.

[73] Assignee: Sperry Corporation, New York, N.Y.

[21] Appl. No.: 108,339

[22] Filed: Dec. 31, 1979

[51] Int. Cl.³ .............................................. G06F 7/52
[52] U.S. Cl. .................................... 364/748; 364/760
[58] Field of Search ............................... 364/748, 760

[56] References Cited

U.S. PATENT DOCUMENTS

| | | | |
|---|---|---|---|
| 3,192,363 | 6/1965 | MacSorley | 364/760 |
| 3,725,649 | 4/1973 | Deerfield | 364/748 |
| 3,730,425 | 5/1973 | Kindell et al. | 364/760 |
| 4,075,704 | 2/1978 | O'Leary | 364/748 |
| 4,208,722 | 6/1980 | Rasala et al. | 364/760 |

Primary Examiner—Jerry Smith
Attorney, Agent, or Firm—G. Donald Weber, Jr.; Eugene T. Battjer

[57] ABSTRACT

There is described a floating point processor architecture which permits multiple bit shifting over strings of binary 1's and strings of binary 0's in a single machine cycle. During a multiply operation, an MQ register (arranged in parallel) which stored the multiplier, shifts the multiplier out for decoding at a rate comparable to the rate at which the partial product is shifted. This is made possible by using a parallel MQ register so that two bits may be shifted per clock cycle. This architecture permits extremely fast multiplication by using a multiple bit shift architecture while minimizing hardware requirements.

17 Claims, 9 Drawing Figures 4,334,284

MULTIPLIER DECODING USING PARALLEL MQ REGISTER

BACKGROUND OF THE INVENTION

1. Field of the Invention

This invention is directed to computer circuitry, in general, and to a floating point processor with unique architecture, in particular.

2. Prior Art

In the prior art, there are many computing machines and systems available. Many of these systems utilize multiplication techniques for portions of the operating requirements. For the most part, these multiplication circuits and techniques are rather cumbersome, slow relative to the computing apparatus operational speed, and require a large number of components to implement the multiplication process. Various attempts have been made in the prior art apparatus and machinery to provide improved operations. For example, one of the known techniques is to "skip over zeros and ones" which is, to a large degree, accomplished by shifting the partial product rapidly when a string of zeros or ones is detected in the multiplier. It has been found that this "skip over" technique is much faster than the known digit-by-digit multiplication. Nevertheless, it requires a fairly large number of components.

The instant invention, described hereinafter, provides a method to retain the speed of the "skip over zeros and ones" technique while reducing the number of components used.

SUMMARY OF THE INVENTION

The invention presented herein describes a floating point processor architecture, and in particular, the fraction data portion thereof, which utilizes an MQ (multiplication) register which is arranged in parallel for the storage of the multiplier. Since two bits are presented by the MQ register at any time, the multiplier may be shifted with a speed increase by a factor of approximately 2. This arrangement enables the multiplier to be shifted at a speed which is comparable to the speed at which the partial product is being shifted—even though the partial product is shifted with a combinational shifter. The output signals from the MQ register are supplied to a multiply-decoder. The decoder, which includes a read only memory is connected to control an arithmetic logic unit and a combinational shifter. A unique decoding technique is used in this invention so that the size of the read only memory is conserved. This further decreases the number of components. The information supplied to the arithmetic and logical unit to be operated upon is supplied by the A and B registers which store the multiplicand and the partial product, respectively. The partial product stored in the B register goes through the combinational shifter which is controlled by the decoder before it is presented to the arithmetic and logical unit. The decoder, effectively, looks for strings of zeros or ones in the multiplier and causes the partial product to be shifted by multiple bits by the combinational shifter.

DESCRIPTION OF THE PREFERRED EMBODIMENT

Figures 1, 8:
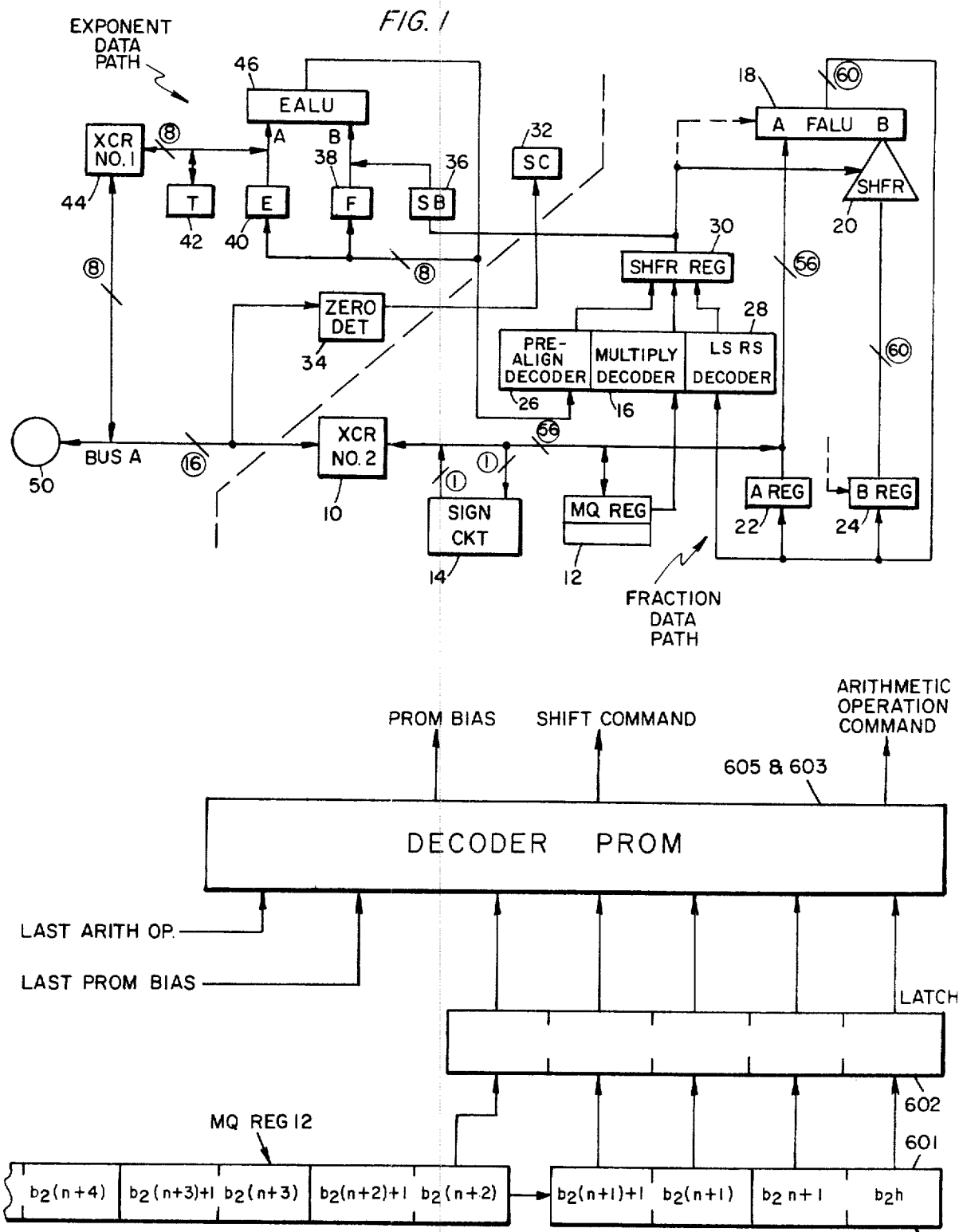
FIG. 1 is a block diagram of the floating point processor architecture in accordance with the instant invention.
FIG. 8 is a detailed block diagram of a portion of the circuit of the instant invention.

Referring now to FIG. 1 there is shown a block diagram of a preferred architecture for the FPP of the instant invention. In particular, the FPP architecture illustrated includes two major data loops, viz. the exponent data loop and the fraction data loop. The fraction data loop is the primary concern of this invention. However, the exponent data loop is shown and described to the extent necessary or desirable to further the understanding of the operations of the fraction data loop of the FPP.

In the FPP architecture, the source 50, which can be any type of computer, central processor or the like, supplies data along bus A. Bus A is a bidirectional bus wherein information may be stored in or fetched from the FPP. In the exponent data path an 8-bit number representing the exponent is supplied to the T register 42 via transceiver 44. The resulting exponent of a floating point operation may also be read back to source 50 from the E register 40 via transceiver 44. The number stored in the T register 42 or the E register 40 may be supplied to EALU 46. The EALU supplies 8-bit numbers to E register 40 and to F register 38 as well as to pre-align decoder 26 (described hereinafter). In addition, shift buffer (SB) 36 also supplies information to the B input of EALU 46, as described hereinafter.

Source 50 also supplies a 16-bit number to zero detector 34 and to transceiver 10 via the bus A. Zero detector 34 supplies signals to step counter 32 as described hereinafter.

Transceiver 10 (like transceiver 44) is connected to transfer information bits in either direction. When information is transferred to FPP from source 50, transceiver 10 receives the bits from bus A and transfers up to 56 bits to the MQ register 12 (which is described in greater detail hereinafter), and to the sign circuit 14. Information is transferred in 8 and 16-bit segments. In the preferred embodiment, MQ register 12 comprises a plurality of register circuits or cells arranged in parallel. The MQ register 12 and A register 22 supply the 56-bit number to the A inputs of the fraction arithmetic logic unit (FALU) 18. The A register 22 also supplies information to the transceiver 10 when data in the FPP is to be read out to bus A. The output terminals of FALU 18 are connected via a 60-bit propagation path to the inputs of the accumulator or B register 24, and, as well, to the A register 22. Also, FALU 18 is connected to the left shift/right shift decoder 28. The output of B register 24 is connected to combinational shifter 20 which supplies a 60-bit signal to the B input terminals of FALU 18.

The output signals from MQ register 12 may also be supplied to multiply decoder 16 serially, two bits at a time, as described in the co-pending application entitled TRAILING ZERO AND ZERO OPERAND DETECTOR, by W. T. C. Wong, filed on Apr. 9, 1979, bearing Ser. No. 028,214 which is now U.S. Pat. No. 4,276,607, and assigned to the common assignee. Multiply decoder 16 is connected to supply control signals to shifter-register 30 along with the control signals from pre-align decoder 26 and left shift/right shift decoder 28. Shifter register 30 supplies signals to combinational shifter 20 and to shift buffer 36.

THEORY OF OPERATION FOR THE BASIC ARITHMETIC OPERATIONS IN THE PREFERED EMBODIMENT

In operation, source 50 supplies signals representative of numbers to the FPP when an FPP load operation is defined. These signals are supplied along the bus A to transceivers 10 and 44, respectively. In particular, the exponent portion of the number is loaded into T register 42 via transceiver 44. The contents of the T register are then transferred to the E and F registers via EALU 46. Similarly, transceiver 10 receives the fraction portion of the number on the bus A and transfers same to MQ register 12 in 16-bit segments (except the most significant segment which consists of 8-bits). This is the floating point number format used in this embodiment of the invention. Of course, other floating point number formats may also be used. The MQ register 12, as described in the co-pending application of Wong noted supra, comprises four 16-bit registers which store the 16-bit word segments supplied to transceiver 10 along the bus A. The register corresponds to the most significant segment stored in an 8-bit segment. Thus, MQ register 12 is loaded with the appropriate fraction bits. Upon decoding of the control literal (CLIT) signals, the contents of the MQ register 12 are transferred to A and B registers 22 and 24, respectively, via FALU 18. At this point the FPP is ready to begin one or more of the operations described hereinafter.

FLOATING-POINT ADD OR SUBTRACT

Because the FPP instructions are single operand instructions, an FPP operation must be preceded by either an FPP load or some other operation so that the exponent of the first operand is loaded in the E and F registers and the fraction of the first operand is loaded in the A and B registers as described above. (The result of a floating point operation is always stored in the E and F, and A and B registers.)

Initiation of either an add or subtract operation causes the exponent of the second operand to be loaded into the T register 42 and the fraction into the MQ register 12. The FPP compares the respective magnitudes of the exponents in T register 42 and F register 38 by means of EALU 46 and then stores the difference of the two in E register 40. If the second operand is the larger operand, the mantissa of the second operand is transferred from the MQ register 12 to the A register 22. Otherwise, it is transferred to the B register 24. That is, B register 24 always contains the mantissa of the operand with the smaller exponent.

To align the mantissas of the two operands, the prealign decoder 26 detects the difference of the exponents and "right shifts" (i.e. shifts to the right) the mantissa of the smaller operand stored in the B register 24 accordingly via SHFR 20 and FALU 18. The addition or subtraction is then performed on the contents of A and B by FALU 18. The result is renormalized by the SHFR 20 and FALU 18 is controlled by the left-shift/right-shift decoder 28. Upon completion of this process, the result is stored in both the A and B registers.

During prealignment, the E register 40, which contains the exponent difference, is used to keep track of the shift. After pre-alignment, the exponent circuits store the larger of the T and F register contents into both the E and F registers. During normalization of the fraction portion of the number, the contents of the E and F registers are also adjusted by either adding or subtracting the contents of E register with data coming from the shift buffer 36. Because buffer 36 is connected to the shift register 30 (SHFR REG), it reflects the number of shifts performed on the fraction portion of the FPP number.

FLOATING-POINT MULTIPLY

As in addition and subtraction, the first operand (multiplicand) is already stored in registers E, F, A, and B. The second operand (multiplier) is loaded into the T and MQ registers. In addition, the step counter 32 (SC) is loaded with a number equal to the length (i.e., number of bits) of the multiplier minus the number of trailing zeros in 16-bit increments. The B register 24 is then cleared (as described in the co-pending application of Wong noted supra). Subsequently, B register 24 is used to store the partial sum produced by the shift-add/subtract process.

Multiplication is performed by a series of shifts-and-addition/subtraction operations. The partial sum stored in B register 24 is shifted to the right by SHFR 20 and then added to or subtracted from the multiplicand stored in A register 22. The number of shifts is controlled by the multiplier stored in MQ register 12 which is decoded by the multiply-decoder 16 which can be in the form of a PROM as described hereinafter.

The step counter 32 is decremented for each shift. The shift-add/subtract operation is repeated until SC equals zero. The product in the B register is normalized, rounded off and stored in the A and B registers. Concurrently, the sum of the exponents of the two operands in the T and F registers is adjusted according to the normalization and is stored in the E and F registers.

FLOATING-POINT DIVIDE

As in addition and subtraction, the first operand (divided) is already stored in the E, F, A, and B registers. The second operand (the divisor) is then loaded into the T and MQ registers.

The divisor is first transferred from MQ register 12 to A register 22 where it is later used as the subtrahend or addend in a series of shift-and-subtract/add operations. The MQ register is then cleared for the storage of the quotient. The SC counter 32 is loaded with the shift-subtract/add count equal to the length of the divisor. Each shift-subtract/add iteration decrements the counter 32. At the same time, the correct quotient bits, depending upon the result of the subtraction, are shifted into the MQ register 12. When counter 32 goes to zero, the whole quotient is stored in the MQ register. The quotient is then transferred to the A and B registers where it is normalized and rounded off. The exponent of the divisor in T register 42 is subtracted from the exponent of the dividend in F register 38 and the difference is stored into the E and F registers. As in the other operations, it is also adjusted during normalization of the mantissa.

Other operations, such as "Floating Negate", "Floating Point Number to Fixed Point Number", and "Floating Square Root" can be performed by this FPP architecture. However, these operations are not described herein inasmuch as the improved multiplication operation is believed to be most pertinent.

DETAILED CIRCUIT DESCRIPTION OF A PREFERRED EMBODIMENT

Figure 2:
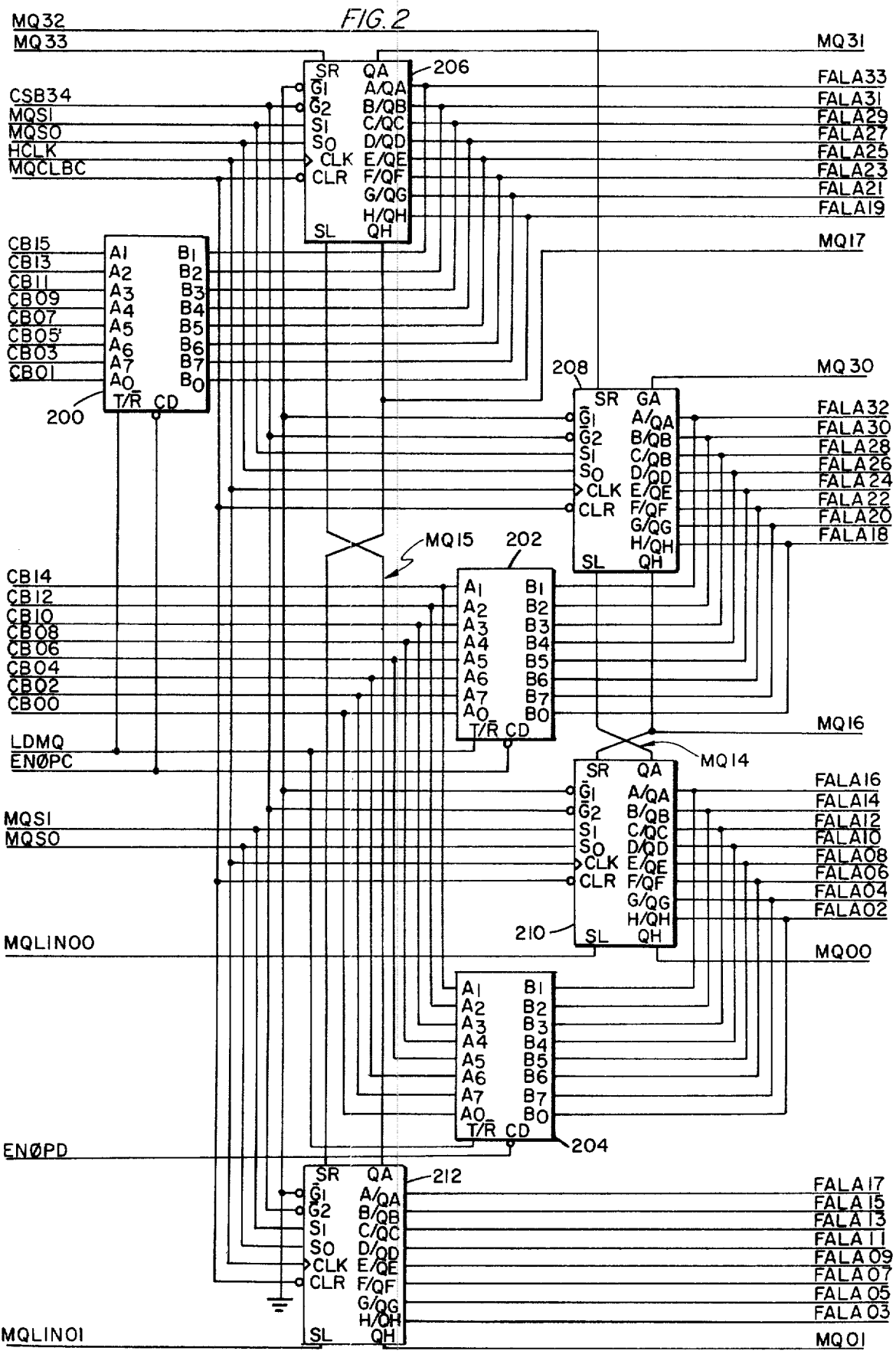
FIG. 2 is a detailed circuit diagram of a portion of the transceiver and MQ register of the FPP architecture.

Referring now to FIG. 2, there is shown, in detail, a portion of the circuit shown in FIG. 1. In particular, transceiver circuits 200, 202, and 204 comprise a portion of transceiver 10 as shown in FIG. 1. Each of these circuits receives input signals from, or transmits signals to, bus A. In the circuit shown in FIG. 2, the odd numbered bus A signals CB01 through CB15 are applied to transceiver circuit 200. Conversely, the even numbered signals CB00 through CB14 are applied to the tranceiver circuits 202 and 204 in parallel. Of course, it should be understood that the circuitry shown in FIG. 2 is representative of only a portion of the circuitry which comprises the actual transceiver circuitry. In a preferred embodiment, seven tranceiver circuits similar to latch circuit 200 shown in FIG. 2 are utilized. These circuits receive the bus A signals for further operations or transmit the results of an operation back to bus A.

Figure 3:
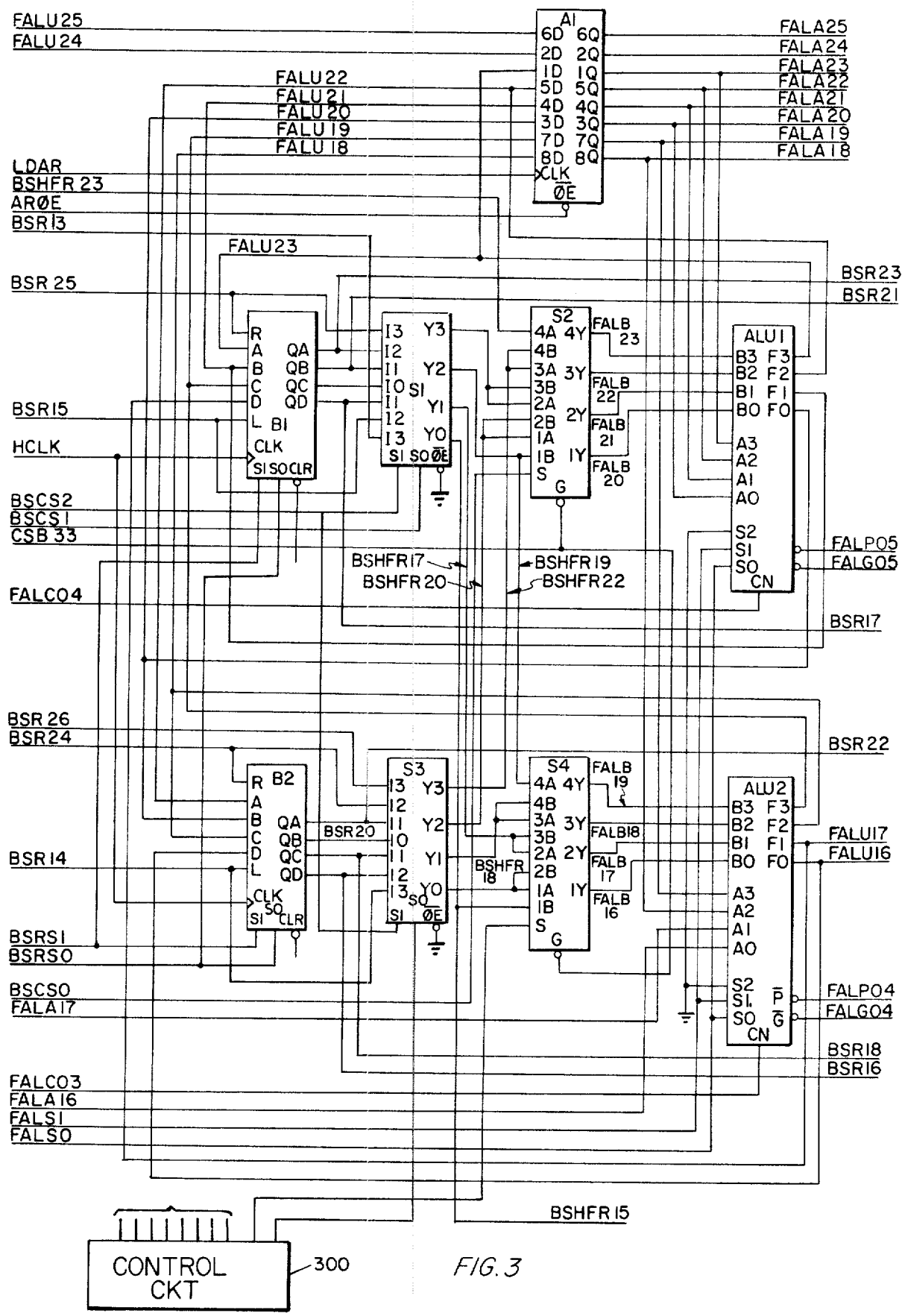
FIG. 3 is a detailed circuit diagram of a portion of the fraction loop of the FPP architecture.

The output terminals of transceivers 200, 202, and 204 are connected to provide signals to MQ register circuits 206,208, and 210, the FALU 18 and to A register 22. These signals are identified as FALAxx where the x's represent identification numerals. (FIG. 3 shows a portion of the A register and the FALU.) Signals provided to MQ register circuit 212 are supplied from a transceiver circuit not shown in FIG. 2. With the appropriate control signals MQS1 and MQSO applied to the S1 and S2 terminals of the MQ registers, the FALA signals from the transceivers may be supplied to and stored in the appropriate MQ registers. Again, it should be understood that there are additional MQ register circuits in the preferred embodiment but which are omitted in this description for convenience. Further note that MQ register circuits 206 and 208 form a 16-bit parallel MQ register segment. One circuit stores the odd bits while the other circuit stores the even bits. Similarly, MQ register circuits 210 and 212 form another 16-bit, parallel MQ register segment. Each MQ register segment is connected to its own transceiver circuits.

Applies to input terminals of MQ registers circuits 206, 208, 210 and 212 are appropriate control signals which include clock signal HCLK, MQ control signals MQS1 and MQSO, and clear signal MQCLBC. Also, appropriate input signals from another segment of the MQ register are applied. Typical of such signals are MQ14 which is supplied to register 208 by register 210 and MQ16 which is supplied to register 210 by register 208. Thus, the MQ register segments may be concatenated and a serial shift operation to the left or to the right can take place. Note that because the MQ register circuits are wired in parallel, a clock signal will cause two bits, an odd bit and an even bit, to be shifted out of the MQ register. Of course, additional register circuits can be connected to the chain to provide a longer register, if so desired.

Briefly, the circuit shown in FIG. 2 operates such that bus A provides signals CB00 through CB15. These signals are applied to all however, the transceivers (seven in all, only three are shown in FIG. 2). Two of the transceivers that correspond to an MQ register segment will be enabled by an appropriate enable signal, e.g. EN0PC; EN0PD supplied to the CD terminal. Furthermore, a signal is supplied to the T/$\overline{\text{R}}$ input terminal of the transceivers which causes the transeivers to be placed in the transmit mode and forms a signal path from the A terminals to the B terminals. When transceivers 200 and 202 in FIG. 2 are enabled, the signals at the B terminals of the transceivers are applied to the terminals of MQ registers 206 and 208 and 210. With the application of the clock signal on the CLK terminal thereof, the MQ register segment which consists of MQ registers 206 and 208, is enabled to store the 16-bit segment of information represented by the signals from the transceivers 200 and 202. Because of the connections as shown, the MQ registers or the A register may also present these stored signals to the A terminals of FALU 18 as described hereinafter. Other shifting and operations of the MQ registers will be described hereinafter.

Referring now to FIG. 3, there is shown a detailed portion of the fraction loop of the circuit shown in FIG. 1. The circuit shown in FIG. 3 includes portions of the FALU 18, A register 22, B register 24 and shifter 20. In particular, the FALA signal lines from the MQ registers (see FIG. 2) are connected to the output terminals of A register A1. In addition, the FALA signal lines are connected from the MQ registers to the A input terminals of FALU 18 represented by circuits ALU 1 and ALU 2. Of course, it must be understood that a plurality of circuits similar to those shown in FIG. 3 can be included in the architecture of the instant invention.

The B input terminals of circuits ALU 1 and ALU 2 are connected to the output terminals of combinational shifter circuits S2 and S4, respectively. The output terminals of combinational shifter circuits S1 and S3 are cross-coupled to the input terminals of shifters S2 and S4, as shown, to give multiple bit shift capability. The output terminals of registers B1 and B2 are connected to input terminals of shifters S1 and S3, respectively. As noted, additional B register devices, as well as additional shifter register devices are utilized in the preferred embodiment. Consequently, certain output signals from registers B1 and B2 are connected to combinational shifters (not shown) similar to the devices included in this drawing. Likewise, B register signals from other registers (not shown) are applied to shifter registers S1 and S3, respectively.

The control circuit 300 represents all the circuits which provide various control signals to the fraction loop portion of the circuit to control shifting of the combinational shifters, the operation of the FALU, shifting and loading of the B register, and the loading of the A register as shown in FIG. 3. In the preferred embodiment, these signals are provided directly by a microsequencer or indirectly through some circuit activated by control signals coming from the microsequencer.

Figure 6:
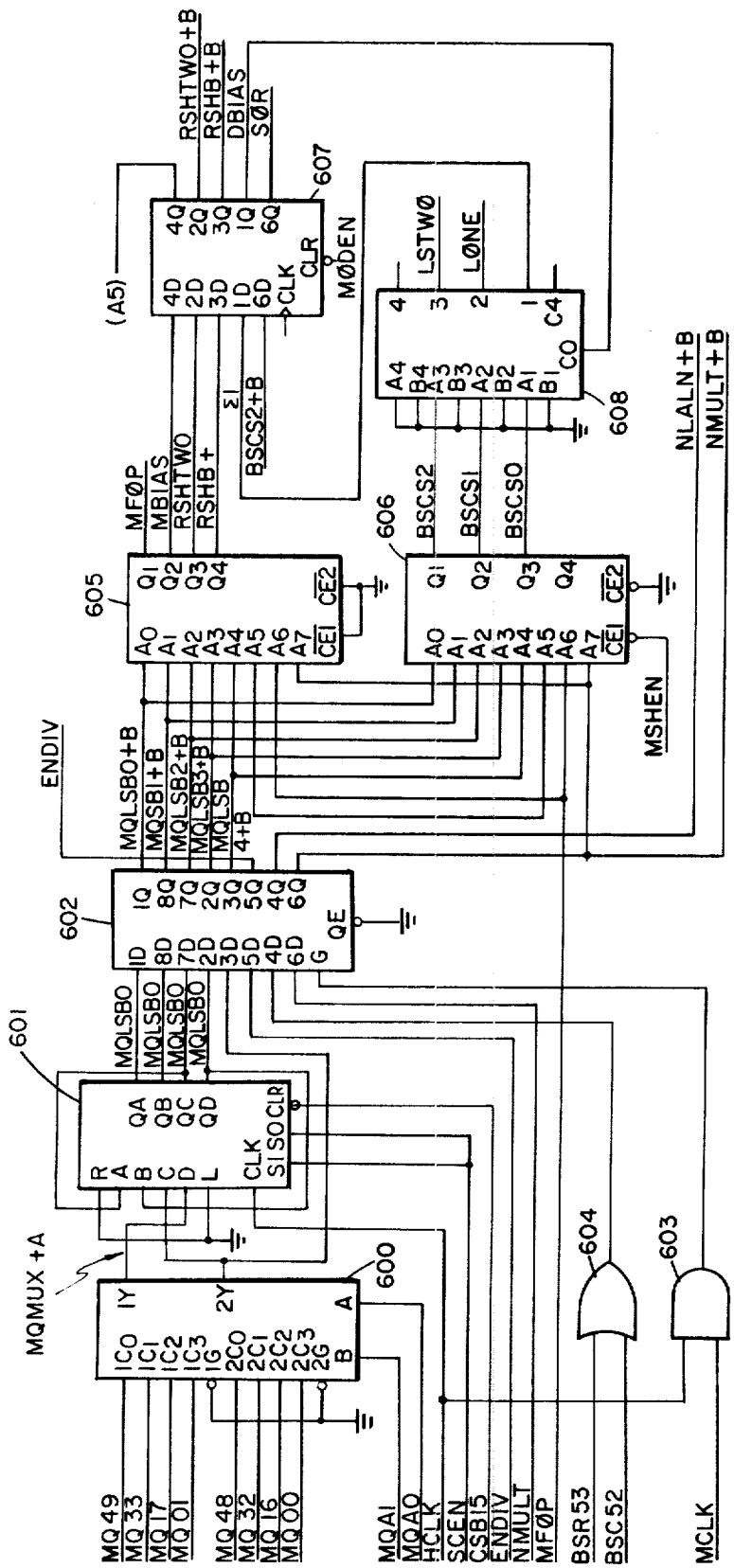
FIG. 6 is a detailed circuit diagram for producing the shifting signals during a multiply operation of the instant invention.

In particular, the circuit shown in FIG. 6 provides the shift signals BSCS0, BSCS1 and BSCS2, to shifter registers S1, S2, S3, and S4 when the microsequencer specifies a multiply operation. Likewise, the control signals BSRS1 and BSRS0 supplied to the B registers B1 and B2 are derived from the control circuit in FIG. 6 during a multiply operation.

Figure 4:
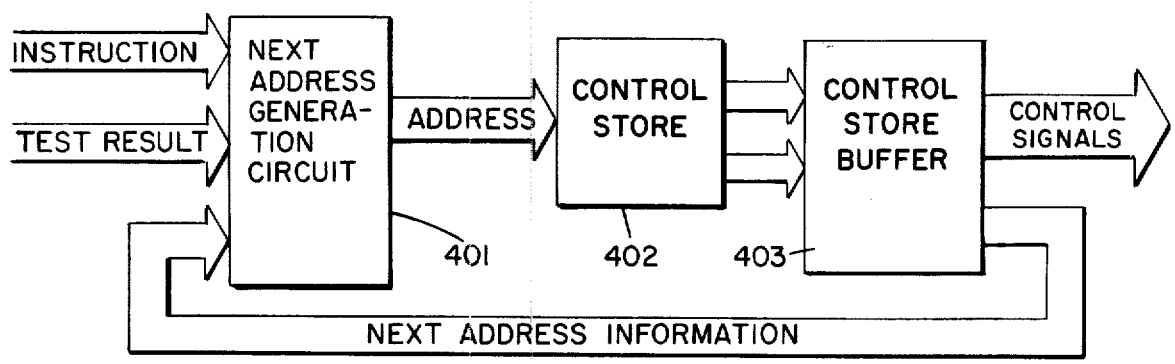
FIG. 4 is a block diagram of the microsequencer of the FPP.

A block diagram of the microsequencer is shown in FIG. 4. There are three main parts, namely, a next address generation circuit 401, a control store 402, and a control store buffer 403. The control store in the preferred embodiment is made up of programmable read only memories (PROMs). The desired control signal patterns, each being called a microinstruction, are stored in the various addresses of the PROMs. The next address generation circuit 401 generates the address for the PROMs. A sequence of micro-instructions may be stepped through by generating a sequence of appropriate addresses. The next address generation circuit 401 accepts an instruction from the host computer, test results of some tests performed in previous microinstructions and next address from the current microinstruction. Therefore, depending upon the instruction, the test results and the next address information, the appropriate next address will be generated which specifies the desired control signals. The outputs from the PROMs are latched into the control store buffer 403 so that they are held stable for one clock period.

Figure 4A:
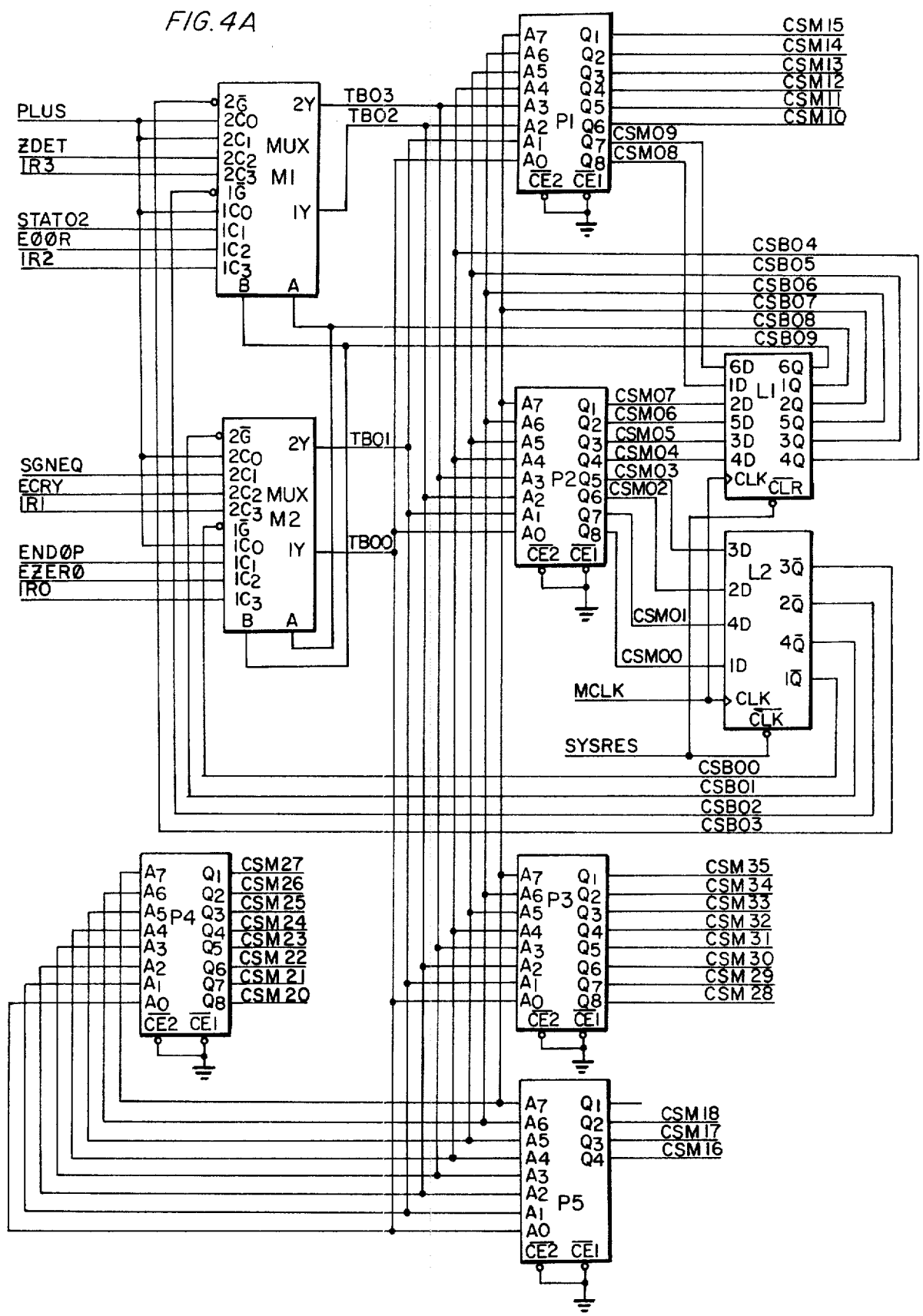
FIG. 4A is a detailed circuit diagram of the next address generation circuit and the circuit control store of the FPP microsequencer.

In particular, FIG. 4A shows a detailed portion of the microsequencer. PROMs P1–P5 make up the control store circuit 402 while multiplexers M1 and M2 make up the next address generation circuit 401.

Returning to FIG. 3, the output terminals of arithmetic and logical elements ALU1 and ALU2 are connected to the A register (register A1) and to the B register (registers B1 and B2), respectively. The output signals from arithmetic and logical elements ALU1 and ALU2 are identified as FALUxx (where the xx's represent numerals).

In operation, the FALAxx signals from either the A register or the MQ registers (shown in FIG. 2) may be supplied to the A inputs of arithmetic and logical elements ALU1 and ALU2 of FALU 18. The information stored in the B register may be shifted by the combinational shifters and supplied to the B inputs of ALU1 and ALU2 of FALU. Arithmetic and logical elements ALU1 and ALU2 operate on the signals presented at the respective A and B inputs and transmit the result to the A and the B registers. The combinational shifter may perform a left shift of up to 3 bits or a right shift of up to 4 bits together with the arithmetic operation performed by the FALU. Again this is but one possible embodiment. Designs using a greater number of shifts may also take advantage of this invention. The FALU may perform the operations A−B, B−A or A+B, where A means A inputs and, B means B inputs.

Referring again to FIG. 4A, there is shown the control store PROM circuitry which comprises a plurality of programmable read only memories P1–P5 (PROM). The PROMs each have the control-enable terminals CE1 and CE2 connected to ground through an inverter terminal. Thus, each of the PROMs is enabled and adapted to receive input address signals supplied thereto, and to supply a bit pattern depending on the address received. The input signals are supplied by the 4:1 multiplexers M1 and M2 (MUX) and control store buffer signals (CSB) as described hereinafter. The output signals from the multiplexers are TB00, TB01, TB02, and TB03. These output signals are produced by the multiplexers in response to control signals such as the interrupts (IR0, IR1, IR2, and IR3), as well as other signals which indicate the status of operands (zero or not zero), the sign of the operands, and the like.

In addition, latch circuits L1 and L2 are connected to receive the output signals (CSM) from the PROM circuits P1 and P2. The input terminals of all of the PROM circuits, as well as the input terminals of the multiplexers M1 and M2 receive the output signals (CSB) from the latch circuits. The circuits are interconnected so that the PROMs are accessed by signals from the various decoding portions of the circuit and produce output signals which are representative thereof.

Figure 5:
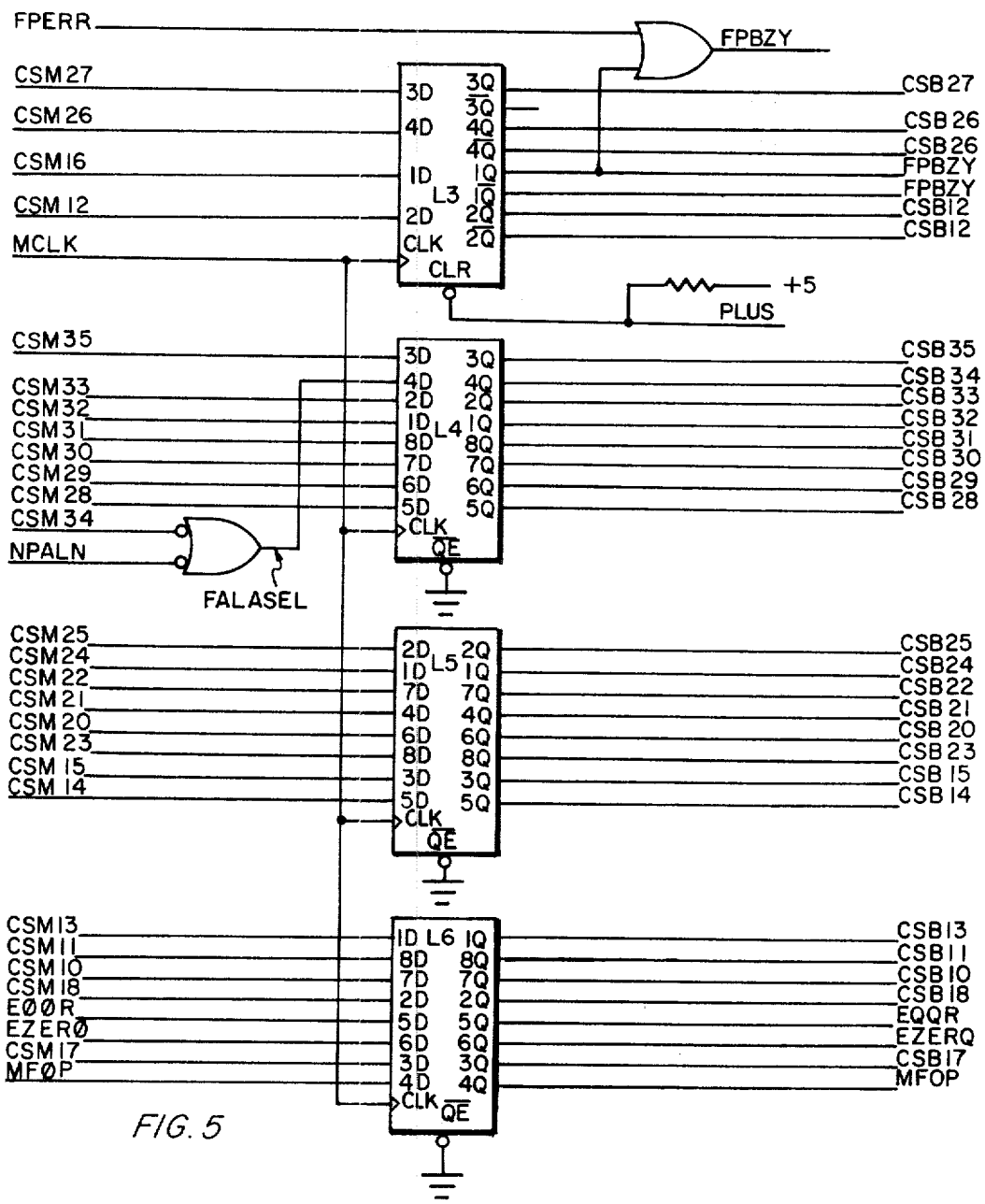
FIG. 5 is a circuit diagram of the control store buffer latch circuitry.

Referring now to FIG. 5, there is shown the control store buffer latch circuitry. The output signals (CSMxx) from the PROM circuitry of FIG. 4A are supplied to the buffer (or latch) circuitry shown in FIG. 5. In particular, the control store memory signals CSM10 through CSM35 are supplied from the PROMs to input terminals of the latch circuits L3–L6. With the application of the appropriate clock signal MCLK, the CSM signals are latched into the latch circuits and made available to other circuitry as will be discussed hereinafter. The output signals from the latch circuits, in particular, the CSB signals are utilized in controlling the shift-left/shift-right operations of the MQ register 12. In addition, certain of the CSB signals are useful in loading the B register or the A register in the fraction loop as well as other registers in the exponent loop (not described in detail herein). Moreover, the CSB signals are utilized in controlling the shifting operations of the B register as described hereinafter.

Referring now to FIG. 6, there is shown a detailed circuit arrangement for producing the shifting signals during multiply for the instant invention. In particular, a 4-to-1 multiplexer 600 is connected to receive, at the input terminals thereof, four pairs of signals, MQ00 through MQ49, from the parallel MQ register section shown in FIG. 2. More particularly, the signal pairs are MQ00, MQ01; MQ16, MQ17; MQ32, MQ33; and MQ48, MQ49. Only one pair of signals will be selected by the multiplexer from among the four pairs depending upon the number of trailing zeros which exists in the multiplier. Trailing zeros may be skipped over in increments of 16 as described in the copending application noted supra of Wong. The output signals from multiplexer 600 are connected to input terminals of pipeline register 601. Pipeline register 601 acts like an extension to the MQ register. It consists of two two-bit stages of storage registers. Signals shifting out from the MQ register are passed onto the first stage and then to the second stage. Inputs C and D and outputs QC and QD of the pipeline register constitute the first stage. The output signals of the first stage, from QC and QD are fed to the input of the second stage A and B. The second stage is made up of input A and B and output QA and QB terminals. S1 and S0 are used to enable the shift while the clear (CLR) terminal may be used to clear the pipeline. The half clock (HCLK) signal is also supplied to pipeline register 601.

Latch circuit 602 is connected to receive the output signals from the pipeline register 601 and a signal directly from the multiplexer output 28. Latch circuit 602 and pipeline register 601 together will constitute a serial-to-parallel conversion circuit. The signals shifted out from MQ are temporarily stored in the pipeline register 601 and then held for one whole clock period (MCLK) for decoding. In addition, latch 602 receives some other control signals including a control signal from AND gate 603 which is activated by the simultaneous application of various system clock signals HCLK and MCLK in order to control the timing of latch 602.

The outputs of latch 602 are connected to the inputs of the multiplier decoder, which, in this embodiment, includes a plurality of PROM circuits 605 and 606. The multi-decode PROMS 605 and 606 receive identical signals at the input terminals. The outputs of latch 602 are connected to input terminals A0 through A4.

Terminal A7 receives the NMULT signal which indicates the end of the multiplication process. Terminal A6 receives the MFφP signal which indicates the arithmetic operation taken place in the last machine cycle. Terminals A5 receive the MBIAS signal which indicates the shift bias stored in latch 607. The MBIAS signal is required to compensate for the inability of MQ to shift an odd number of bits out as described hereinafter.

PROM 606 produces the shifter control signals BSCS0 through BSCS2 which are supplied to the shifter control circuitry described relative to FIG. 3.

PROM 605 produces the MFφP signal as well as the MBIAS signal which is temporarily stored in latch 602 and returned to terminals A6 and A5 of PROM 605 and PROM 606. PROM 605 also produces the right shift B register signal RSHB and the right shift 2 signal RSHTW0 which signifies a right shift of 2 bits. These signals from PROM 605 are also temporarily stored in latch 607 to establish a fixed signal level throughout one machine cycle. Note that PROM 606 is enabled by the MSHEN signal. This signal is derived from a control signal used to specify a multiply operation and is provided by the microsequencer. Therefore, the PROMS are enabled only during the multiply operation. For other operations, the circuit in FIG. 6 will not affect the operation of the faction loop.

The following paragraphs discuss how fast multiplication that skips over strings of zeros and strings of ones in the multiplier may be implemented by the parallel MQ register method.

To define the method of operation in the instant application, it is necessary to define what constitutes a string in the multiplier. A string of 1's or a string of 0's is defined as two or more identical bits of 1's or 0's. Conversely, a single 0 in a string of 1's or a single 1 in a string of 0's is defined as an isolated 0 or an isolated 1, respectively. In order to illustrate the definitions, the following example is provided Multiplier=[00 . . . 0]10110010001]00 . . . 0]

The numerals inside the brackets are not part of the exemplary multiplier. The left most bracketed 0's are depicted inasmuch as it is assumed that the bits before the leading bit of the multiplier are 0's. The right-most bracketed zeros indicate that the decoding operation relative to the multiplier is begun with a long string of 0's (i.e. the initial condition of the decoder). Thereafter, it is noted that the first (right end) 1 is an isolated 1. The following three 0's (reading to the left) from a string of 0's. Inasmuch as the next bit, a binary 1, is followed by additional 0's, the 1 is an isolated while the zeros are a continuation of the string of zeros. However, the next 1 is followed by an additional 1 thereby establishing a string of 1's. The next 0 is followed by a 1 whereby the 0 is an isolated 0 and the 1 is a continuation of the string of 1's. This illustration shows strings of 1's and 0's, isolated 1's and 0's, and the transitional areas.

The operation of the system follows the rules that the partial product of the multiplication is stored in the B register 24 which was cleared to zero at the beginning of the multiply. The multiplier number is shifted out of the MQ register 12 starting from the LSB and examined by the decoder 16 according to the rule described above. Subsequently, the multiplicand stored in the A register 22 is added to the partial product stored in the B register 24 whenever an isolated 1 is encountered or at the beginning of a string of 0's. Conversely, the multiplicand is subtracted from the partial product whenever an isolated 0 is encountered or at the beginning of a string of 1's.

The partial product shift control shifts the partial product in the B register by controlling the combinational shifter 20 according to the bit pattern of the multiplier. Multiple shifts are performed over strings of 0's and strings of 1's. The shift operation stops only at the beginning of a string or at an isolated one or an isolated zero to perform an add or subtract operation.

Using this method, in order to have a maximum shift of 4 bits, it is necessary to monitor 5 bits from the multiplier in order to identify the difference between the beginning of a string of 0's or an isolated 0. If only 4 bits are monitored, it is impossible to differentiate between the two cases. (Likewise, of course, the difference between a string of 1's or an isolated 1 produces the same difficulty). For example, in the bit pattern x 0 1 1 1, it is impossible to determine whether the 0 is an isolated 0 or the beginning of a string of 0's unless the value of x is known. That is, if x is a 0, then the existing 0 is the beginning of a string of 0's in which case the multiplicand is added as noted above. Conversely, if the x is a 1, then the existing 0 represents an isolated 0 wherein the multiplicand must be subtracted as noted above.

BACKGROUND THEORY

The algorithm this FPP employs to shift over ones and zeros in doing multiplication is fairly complicated. In order to simplify the explanation, several other multiplication techniques are described before the technique used in this FPP is described.

One simple method used in multiplication is to examine the multiplier on a bit-by-bit basis. If the bit is a 0, the multiplicand is shifted left one place. If the bit is a 1, the multiplicand is shifted left and then added to the partial product.

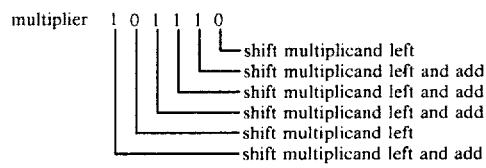

The same result may also be obtained by shifting the partial product to the right instead of shifting the multiplicand to the left. In fact, this has proved to be a better method because the width of the data path does not have to be doubled. Instead the low order bits of the partial product are simply shifted out of the register and lost. This method only shifts over strings of zeros, i.e. no arithmetic operation occurs. On the other hand, each "one" in the multiplier requires one addition. One refinement is to shift over both strings of ones and strings of zeros. If the hardware can be built to perform shifts at very high speed, i.e. considerably faster than an arithmetic operation, then shifting over both strings of ones and strings of zeros will provide further speed enhancement. This operation is possible because 111 . . . 1 = 1000 . . . 0–1. The latter expression contains only two ones, regardless of the length of the string of ones. Therefore, any string of ones may be reduced to one subtraction at the LSB position of the string and one addition at the bit position preceeding the MSB of the string while the rest of the string may simply be shifted over. This is illustrated in the example below:

EXAMPLE

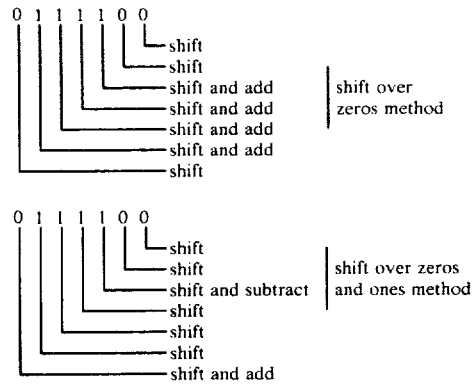

In the design of this invention, the FPP contains a combinational shifter which allows shifting the partial product by up to four bit positions and, as were, performing an arithmetic operation (add or subtract) in one machine cycle. The multiplier may also be shifted up to four bits for examination in one machine cycle. Then the first approach in the above example requires four machine cycles to complete, namely:

shift 1 and subtract
shift 3 and add
shift 1 and subtract
shift 3 and add

While the second approach requires only three machine cycles to compete, namely:

shift 1 and subtract
shift 3 and subtract
shift 4 and add

In this design, the second approach which shifts over both ones and zeros is used for better performance.

An additional improvement in this method is obtained when either an isolated 1 occurs in a string of 0's or an isolated 0 occurs in a string of 1's. In this improved method, the multiplier is examined by "looking ahead" two bits to identify strings of either 1's or 0's. A string is defined as two or more consecutive identical bits as described above and as shown in the following example.

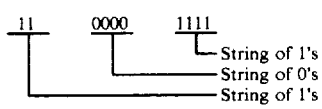

A single bit within a string which is different from the string is called an isolated bit. An example of this isolated bit is shown in the following example.

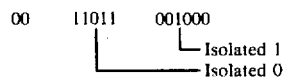

To highlight the advantage of this improved method, the following example contains an isolated 0 in a string of 1's and the unmodified algorithm is used.

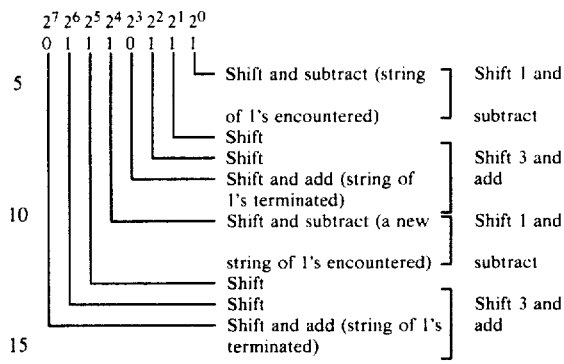

In the preceding example, an addition is performed in the $2^3$ bit position and followed by a subtraction in the next bit position ($2^4$). These two operations can be reduced to one arithmetic operation by performing the subtraction where the isolated 0 is located. This is possible because $(-2^4)+(2^3)=(-2^3)$. Thus, the previous example can be reduced as indicated.

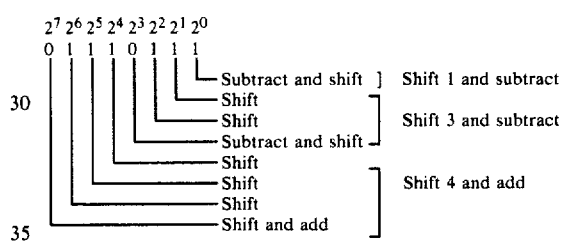

This example then requires only three machine cycles to execute instead of four.

The FPP of this invention will handle an isolated 1 in a string of 0's as shown in the following example. Assume the last operation was an add and a string of 0's is presented:

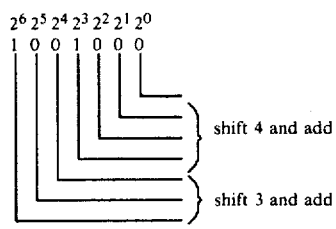

This example requires only two machine cycles to execute. Therefore, a generalized rule can be formulated to perform multiplication in accordance with the above described method.

| Conditions | Operations |
| --- | --- |
| Beginning of a string of zeros | Add |
| Isolated one in a string of zeros | Add |
| Beginning of a string of ones | Subtract |
| Isolated zero in a string of ones | Subtract |

These rules can be illustrated with the following example:

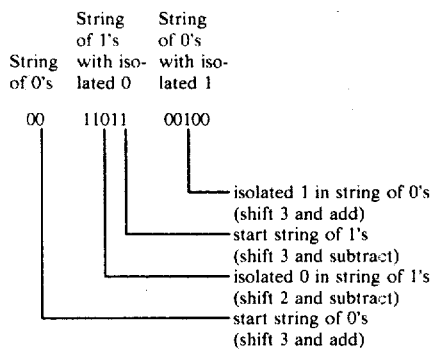

(assuming the multiplier is 001101100100.)

It can also be seen from the above rules that, if the last operation is an "add", a string of zeros is present. Conversely, if the last operation is a subtract, a string of ones is present. At the beginning of a multiply, it is alway assumed that the last operation was an add, and a string of zeros is presented.

Since in this FPP the maximum number of right shifts that can be performed together with an arithmetic operation (add or subtract) is four, there may exist some cases wherein the number of shifts required exceeds the capability of this FPP. For example, in a 16-bit word all of the bits may be zeros or ones. In these cases the shifts are performed in more than one machine cycle. The arithmetic operation is carried out only at the last shift cycle. Fortunately, strings of this length are very rare. A combinational shifter that can shift up to four bit positions provides a good compromise between shift capability vs propagation delay and circuit complexity. The multiplier is actually monitored by a PROM decoder which interprets the bit pattern and converts the pattern into shift commands (i.e. the number of bit positions needed to be shifted) and arithmetic operation command (add or subtract). If only four bits of the multiplier are monitored, there exist some bit patterns for which the arithmetic operation cannot be determined. For example, if the last operation is an add, in a string of zeros, and if the bit pattern "1 0 0 0" is encountered, it is known that a shift by four bit positions is required. However, there is no way to know what the arithmetic operation should be. This is because if the one at the end of the string is an isolated one in a string of zeros, an add should be performed. However, if the one is the beginning of a string of ones, then a subtract should be performed. Therefore, the arithmetic operation actually depends on the bit to the lift of the one. The same problem arises if the last operation is a subtract, in a string of ones, and the bit pattern "0 1 1 1" is encountered. The decoder, therefore, has to monitor five bits of the multiplier.

The bits patterns and the corresponding shift command, as well as the operation command, are described in the Tables below. A review of the Tables will indicate the improved operation obtained with the instant invention.

In particular, Tables 1 and 2 show the shift mechanism if a parallel connected MQ register is not used. In this situation, five bits of the multiplier have to be monitored as described above.

DESCRIPTION OF THE OPERATION PERFORMED BY THE INSTANT INVENTION

Figure 7:
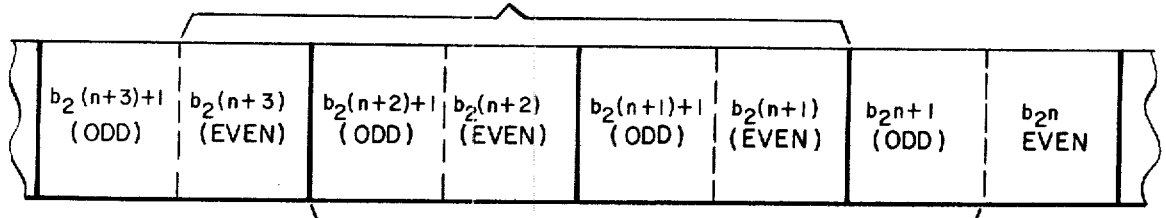
FIG. 7 is a diagrammatic representation of the bits supplied to the PROM decoder from the MQ register.

In the instant invention, a parallel MQ register is used. Referring to FIG. 1, the multiplier is stored in the MQ register 12 and the multiplicand is stored in the A register 22. The B register 24, initially cleared to zero, is used to accumulate the partial product. The shifter 20 provides the required shifts on the partial product in combination with the arithmetic operations of ALU 18. The multiplier is shifted out of the MQ register 12 and examined by decoder 16. The bits 0, 2, 4, 6, ... of the multiplier are the even bits and bits 1, 3, 5, 7, ... are the odd bits. Since the MQ register is connected in parallel, an odd bit and an even bit are shifted out per clock signal, for example, bits 0, 1; bits 2, 3; bits 4, 5 and so forth. Alternatively, four bits of the multiplier may be shifted out in one machine cycle by using a clock signal running at twice the rate of the machine cycle. Since the multiplier is shifting out of the MQ register in multiples of two bits, the decoder 16 actually has to monitor six bits instead of five bits if no improvement to the decode circuit is made, because a string may begin on an odd bit or on an even bit and an isolated one in a string of zeros, or an isolated zero in a string of ones may also be on an odd bit or on an even bit. Whenever the last shift stops on an even bit, MQ register 12 shifts an extra bit out while the PROM will look backward by one bit (PROM bias = 1) as shown in FIG. 7. The appearance of the bit pattern, the shift command, and the operation command will be that shown in Tables 3 and 4. These Tables show the shifting mechanism with a parallel connected MQ register, but implemented in a straight forward manner. Note that the decoder has to monitor six bits. In addition, the MQ register may have to shift 0, 2 or 4 bits out during a machine cycle.

In the circuit design of the instant invention, an improvement has been made so that only five bits have to be monitored by the PROM decoder. Moreover, MQ register 12 will be shifted by either two bits or four bits. That is, a zero bit shift is eliminated. Therefore, this invention allows simplification of the circuitry. The simplification is achieved by modifying the shift command in two particular bit patterns, namely, in the case of a string of zeros, the PROM bias signal equals 1 and the bit pattern is "X 1 0 0 0 0". The partial product in B register 24 and the multiplier stored in MQ register 12 are then shifted by two bit positions instead of four bit positions. (Table 5) Similarly, in the case of a string of ones, the PROM bias signal equals one and the bit pattern is "X 0 1 1 1 1", the partial product in B register 24, and the multiplier stored in MQ register 12 are also shifted by two bit positions instead of four bit positions. (Table 6) The first change actually eliminates all of the bit patterns with a trailing one in the table for a string of zeros (Table 5) when the PROM bias signal equals 1. These bit patterns are marked through with a horizontal line to emphasize the pattern reduction.

The second change eliminates all the bit patterns with a trailing zero in the table for a string of ones when the PROM bias signal equals 1 (Table 6). Therefore, all the cases where MQ register 12 has to shift by zero bit positions are eliminated. Moreover, since the trailing bit is always a 0 in the table for a string of zeros when the shift bias signal equals one, and the trailing bit is always a 1 in the table for a string of ones when the PROM bias equals one, this trailing bit does not have to be monitored. Therefore the circuit actually looks like FIGS. 6 and FIG. 8, and the tables are modified, as shown in Tables 5 and 6. That is, the MQ register 12 produces a plurality of output signals which are shifted out in series. Serial to parallel converter 601 and the last bit position in register 12 supply signals to latch 602 for temporary storage. Latch 602 supplies signals which operate as address inputs to decoder PROM 605 and 606. The contents of the selected address in PROM 605/606 are supplied to the other circuitry as discussed above. This reduced amount of information is actually coded into the PROM and look like Tables 7-10 which are substantially reduced in size relative to the prior PROM. Thus, improved operation is achieved more economically.

Thus, there is shown and described a preferred embodiment of the invention. In this description, a general arrangement is provided. In addition, some detailed schematic diagrams of portions of the circuit have been shown. These detailed circuits are intended to be illustrative only and to show certain circuit configurations. These configurations represent the best mode of the invention currently known. It is understood that other modifications or improvements can be made in the specific circuits and the detailed configurations of the system. However, any such improvements and modifications are intended to be included within the description as noted herein. The illustrative circuits are not intended to be limitative. Rather, the scope of this application is limited only by the claims appended hereto. Nevertheless, the circuits as shown, utilizing the parallel MQ register permit an improved circuit operation. Furthermore, the improved circuit operation permits an optimum PROM code arrangement whereby reduced memory storage is required as well as reduced control circuitry and the like. Even with these reduced circuit requirements, high speed operation is achieved as a result of the circuit configuration which is implemented.

TABLE 1

| | String of Zeros | |
|---|---|---|
| Bit Pattern Examined | # of Shifts | Arith. Oper. |
| 0 0 0 0 0 | 4 | Shift only |
| 0 0 0 0 1 | 1 | + |
| 0 0 0 1 0 | 2 | + |
| 0 0 0 1 1 | 1 | |
| 0 0 1 0 0 | 3 | + |
| 0 0 1 0 1 | 1 | + |
| 0 0 1 1 0 | 2 | |
| 0 0 1 1 1 | 1 | |
| 0 1 0 0 0 | 4 | + |
| 0 1 0 0 1 | 1 | + |
| 0 1 0 1 0 | 2 | + |
| 0 1 0 1 1 | 1 | |
| 0 1 1 0 0 | 3 | |
| 0 1 1 0 1 | 1 | + |
| 0 1 1 1 0 | 2 | |

TABLE 1-continued

| | String of Zeros | |
|---|---|---|
| Bit Pattern Examined | # of Shifts | Arith. Oper. |
| 0 1 1 1 1 | 1 | |
| 1 0 0 0 0 | 4 | Shift only |
| 1 0 0 0 1 | 1 | + |
| 1 0 0 1 0 | 2 | |
| 1 0 0 1 1 | 1 | |
| 1 0 1 0 0 | 3 | + |
| 1 0 1 0 1 | 1 | + |
| 1 0 1 1 0 | 2 | |
| 1 0 1 1 1 | 1 | |
| 1 1 0 0 0 | 4 | |
| 1 1 0 0 1 | 1 | + |
| 1 1 0 1 0 | 2 | + |
| 1 1 0 1 1 | 1 | |
| 1 1 1 0 0 | 3 | |
| 1 1 1 0 1 | 1 | + |
| 1 1 1 1 0 | 2 | |
| 1 1 1 1 1 | 1 | |

TABLE 2

| | String of Ones | |
|---|---|---|
| Bit Pattern Examined | # of Shifts | Arith. Oper. |
| 0 0 0 0 0 | 1 | + |
| 0 0 0 0 1 | 2 | + |
| 0 0 0 1 0 | 1 | |
| 0 0 0 1 1 | 3 | + |
| 0 0 1 0 0 | 1 | + |
| 0 0 1 0 1 | 2 | |
| 0 0 1 1 0 | 1 | |
| 0 0 1 1 1 | 4 | + |
| 0 1 0 0 0 | 1 | + |
| 0 1 0 0 1 | 2 | + |
| 0 1 0 1 0 | 1 | |
| 0 1 0 1 1 | 3 | |
| 0 1 1 0 0 | 1 | + |
| 0 1 1 0 1 | 2 | |
| 0 1 1 1 0 | 1 | |
| 0 1 1 1 1 | 4 | Shift only |
| 1 0 0 0 0 | 1 | + |
| 1 0 0 0 1 | 2 | + |
| 1 0 0 1 0 | 1 | |
| 1 0 0 1 1 | 3 | + |
| 1 0 1 0 0 | 1 | + |
| 1 0 1 0 1 | 2 | |
| 1 0 1 1 0 | 1 | |
| 1 0 1 1 1 | 4 | |
| 1 1 0 0 0 | 1 | + |
| 1 1 0 0 1 | 2 | + |
| 1 1 0 1 0 | 1 | |
| 1 1 0 1 1 | 3 | |
| 1 1 1 0 0 | 1 | + |
| 1 1 1 0 1 | 2 | |
| 1 1 1 1 0 | 1 | |
| 1 1 1 1 1 | 4 | Shift only |

TABLE 3

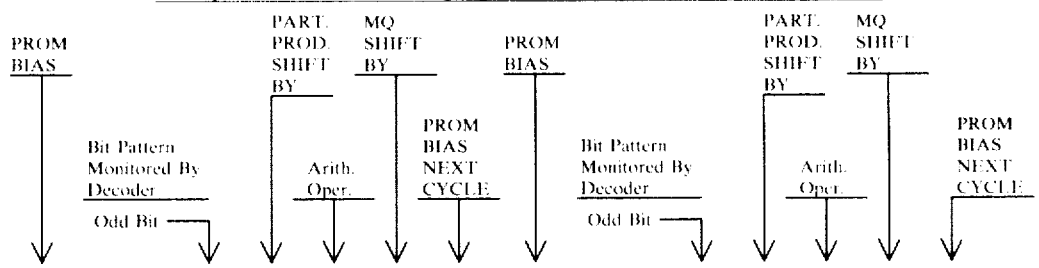

Multiplier Decode for Parallel MQ Register without Improvement of Instant Invention TABLE 3-continued

| | | | | | | | | | | | | | | | | | | | | | |
|---|---|---|---|---|---|---|---|---|---|---|---|---|---|---|---|---|---|---|---|---|---|
| 0 | 0 | 0 | 0 | 0 | 0 | x | 4 | Shift Only | 4 | 0 | 1 | x | 0 | 0 | 0 | 0 | 0 | 4 | Shift Only | 4 | 1 |
| | 0 | 0 | 0 | 0 | 1 | x | 1 | + | 2 | 1 | | x | 0 | 0 | 0 | 0 | 1 | 1 | + | 0 | 0 |
| | 0 | 0 | 0 | 1 | 0 | x | 2 | + | 2 | 0 | | x | 0 | 0 | 0 | 1 | 0 | 2 | + | 2 | 1 |
| | 0 | 0 | 0 | 1 | 1 | x | 1 | | 2 | 1 | | x | 0 | 0 | 0 | 1 | 1 | 1 | | 0 | 0 |
| | 0 | 0 | 1 | 0 | 0 | x | 3 | + | 4 | 1 | | x | 0 | 0 | 1 | 0 | 0 | 3 | + | 2 | 0 |
| | 0 | 0 | 1 | 0 | 1 | x | 1 | + | 2 | 1 | | x | 0 | 0 | 1 | 0 | 1 | 1 | + | 0 | 0 |
| | 0 | 0 | 1 | 1 | 0 | x | 2 | | 2 | 0 | | x | 0 | 0 | 1 | 1 | 0 | 2 | | 2 | 1 |
| ↓ | 0 | 0 | 1 | 1 | 1 | x | 1 | | 2 | 1 | ↓ | x | 0 | 0 | 1 | 1 | 1 | 1 | | 0 | 0 |
| | 0 | 1 | 0 | 0 | 0 | x | 4 | + | 4 | 0 | | x | 0 | 1 | 0 | 0 | 0 | 4 | + | 2 | 1 |
| | 0 | 1 | 0 | 0 | 1 | x | 1 | + | 2 | 1 | | x | 0 | 1 | 0 | 0 | 1 | 1 | + | 0 | 0 |
| | 0 | 1 | 0 | 1 | 0 | x | 2 | + | 2 | 0 | | x | 0 | 1 | 0 | 1 | 0 | 2 | + | 2 | 1 |
| | 0 | 1 | 0 | 1 | 1 | x | 1 | | 2 | 1 | | x | 0 | 1 | 0 | 1 | 1 | 1 | | 0 | 0 |
| | 1 | 0 | 0 | 1 | 1 | x | 3 | | 4 | 1 | | x | 0 | 1 | 1 | 0 | 0 | 3 | | 2 | 0 |
| | 0 | 1 | 1 | 0 | 1 | x | 1 | + | 2 | 1 | | x | 0 | 1 | 1 | 0 | 1 | 1 | | 0 | 0 |
| | 0 | 1 | 1 | 1 | 0 | x | 2 | − | 2 | 0 | | x | 0 | 1 | 1 | 1 | 0 | 2 | | 2 | 1 |
| ↓ | 0 | 1 | 1 | 1 | 1 | x | 1 | − | 2 | 1 | ↓ | x | 0 | 1 | 1 | 1 | 1 | 1 | | 0 | 0 |
| | 1 | 0 | 0 | 0 | 0 | x | 4 | Shift Only | 4 | 0 | | x | 1 | 0 | 0 | 0 | 0 | 4 | Shift Only | 4 | 1 |
| | 1 | 0 | 0 | 0 | 1 | x | 1 | + | 2 | 1 | | x | 1 | 0 | 0 | 0 | 1 | 1 | + | 0 | 0 |
| | 1 | 0 | 0 | 1 | 0 | x | 2 | + | 2 | − | | x | 1 | 0 | 0 | 1 | 0 | 2 | + | 2 | 1 |
| | 1 | 0 | 0 | 1 | 1 | x | 1 | − | 2 | 1 | | x | 1 | 0 | 0 | 1 | 1 | 1 | | 0 | 0 |
| | 1 | 0 | 1 | 0 | 0 | x | 3 | + | 4 | 1 | | x | 1 | 0 | 1 | 0 | 0 | 3 | + | 2 | 0 |
| | 1 | 0 | 1 | 0 | 1 | x | 1 | + | 2 | 1 | | x | 1 | 0 | 1 | 0 | 1 | 1 | + | 0 | 0 |
| | 1 | 0 | 1 | 1 | 0 | x | 2 | − | 2 | 0 | | x | 1 | 0 | 1 | 1 | 0 | 2 | | 2 | 1 |
| ↓ | 1 | 0 | 1 | 1 | 1 | x | 1 | − | 2 | 1 | ↓ | x | 1 | 0 | x | x | 1 | 1 | − | 0 | 0 |
| | 1 | 1 | 0 | 0 | 0 | x | 4 | − | 4 | 0 | | x | 1 | 1 | 0 | 0 | 0 | 4 | | 4 | 1 |
| | 1 | 1 | 0 | 0 | 1 | x | 1 | + | 2 | 1 | | x | 1 | 1 | 0 | 0 | 1 | 1 | + | 0 | 0 |
| | 1 | 1 | 0 | 1 | 0 | x | 2 | + | 2 | 0 | | x | 1 | 1 | 0 | 1 | 0 | 2 | + | 2 | 1 |
| | 1 | 1 | 0 | 1 | 1 | x | 1 | − | 2 | 1 | | x | 1 | 1 | 0 | 1 | 1 | 1 | − | 0 | 0 |
| | 1 | 1 | 1 | 0 | 0 | x | 3 | − | 4 | 1 | | x | 1 | 1 | 1 | 0 | 0 | 3 | | 2 | 0 |
| | 1 | 1 | 1 | 0 | 1 | x | 1 | + | 2 | 1 | | x | 1 | 1 | 1 | 0 | 1 | 1 | + | 0 | 0 |
| | 1 | 1 | 1 | 1 | 0 | x | 2 | − | 2 | 0 | | x | 1 | 1 | 1 | 1 | 0 | 2 | | 2 | 1 |
| ↓ | 1 | 1 | 1 | 1 | 1 | x | 1 | − | 2 | 1 | ↓ | x | 1 | 1 | 1 | 1 | 1 | 1 | − | 0 | 0 | x  Don't Care

TABLE 4

Multiplier Decode for Parallel MQ Register without Improvement of Instant Invention.

| PROM BIAS | Bit Pattern Monitored By Decoder Odd Bit | PART. PROD. SHIFT BY | MQ SHIFT BY | Arith. Oper. | PROM BIAS NEXT CYCLE | PROM BIAS | Bit Pattern Monitored By Decoder Odd Bit | PART. PROD. SHIFT BY | MQ SHIFT BY | Arith. Oper. | PROM BIAS NEXT CYCLE |
|---|---|---|---|---|---|---|---|---|---|---|---|
| 0 | 0 0 0 0 0 x | 1 | + | 2 | 1 | 1 | x 0 0 0 0 0 | 1 | + | 0 | 0 |
| | 0 0 0 0 1 x | 2 | + | 2 | 0 | | x 0 0 0 0 1 | 2 | + | 2 | 1 |
| | 0 0 0 1 0 x | 1 | | 2 | 1 | | x 0 0 0 1 0 | 1 | | 0 | 0 |
| ↓ | 0 0 0 1 1 x | 3 | + | 4 | 1 | ↓ | x 0 0 0 1 1 | 3 | + | 2 | 0 |
| | 0 0 1 0 0 x | 1 | + | 2 | 1 | | x 0 0 1 0 0 | 1 | + | 0 | 0 |
| | 0 0 1 0 1 x | 2 | | 2 | 0 | | x 0 0 1 0 1 | 2 | | 2 | 1 |
| | 0 0 1 1 0 x | 1 | | 2 | 1 | | x 0 0 1 1 0 | 1 | | 0 | 0 |
| ↓ | 0 0 1 1 1 x | 4 | + | 4 | 0 | ↓ | x 0 0 1 1 1 | 4 | + | 2 | 1 |
| | 0 1 0 0 0 x | 1 | + | 2 | 1 | | x 0 1 0 0 0 | 1 | + | 0 | 0 |
| | 0 1 0 0 1 x | 2 | + | 2 | 0 | | x 0 1 0 0 1 | 2 | + | 2 | 1 |
| | 0 1 0 1 0 x | 1 | | 2 | 1 | | x 0 1 0 1 0 | 1 | | 0 | 0 |
| ↓ | 0 1 0 1 1 x | 3 | | 4 | 1 | ↓ | x 0 1 0 1 1 | 3 | | 2 | 0 |
| | 1 0 0 1 1 x | 1 | + | 2 | 1 | | x 0 1 1 0 0 | 1 | | 0 | 0 |
| | 0 1 1 0 1 x | 2 | | 2 | 0 | | x 0 1 1 0 1 | 2 | | 2 | 1 |
| | 0 1 1 1 0 x | 1 | | 2 | 1 | | x 0 1 1 1 0 | 1 | | 0 | 0 |
| ↓ | 0 1 1 1 1 x | 4 | Shift Only | 4 | 0 | ↓ | x 0 1 1 1 1 | 4 | Shift Only | 4 | 1 |
| | 1 0 0 0 0 x | | | | | | x 1 0 0 0 0 | | | | |
| | 1 0 0 0 1 x | 1 | + | 2 | 1 | | | 1 | + | 0 | 0 |
| | 1 0 0 0 1 x | 2 | + | 2 | 1 | | x 1 0 0 0 1 | 2 | + | 2 | 1 |
| | 1 0 0 1 0 x | 1 | | 2 | 1 | ↓ | x 1 0 0 1 0 | 1 | | 0 | 0 |

TABLE 4-continued

| | | | | | | | | | | | | | | | | |
|---|---|---|---|---|---|---|---|---|---|---|---|---|---|---|---|---|
| ↓ | 1 0 0 1 1 x | 3 | + | 4 | 1 | ↓ | x 1 0 0 1 1 | 3 | + | 2 | 0 |
| | 1 0 1 0 0 x | 1 | + | 2 | 1 | | x 1 0 1 0 0 | 1 | + | 0 | 0 |
| | 1 0 1 0 1 x | 2 | − | 2 | 0 | | x 1 0 1 0 1 | 2 | − | 2 | 1 |
| | 1 0 1 1 0 x | 1 | − | 2 | 1 | | x 1 0 1 1 0 | 1 | − | 0 | 0 |
| ↓ | 1 0 1 1 1 x | 4 | − | 4 | 0 | ↓ | x 1 0 x x 1 | 4 | − | 4 | 1 |
| | 1 1 0 0 0 x | 1 | + | 2 | 1 | | x 1 1 0 0 0 | 1 | + | 0 | 0 |
| | 1 1 0 0 1 x | 2 | + | 2 | 0 | | x 1 1 0 0 1 | 2 | + | 2 | 1 |
| | 1 1 0 1 0 x | 1 | − | 2 | 1 | | x 1 1 0 1 0 | 1 | − | 0 | 0 |
| ↓ | 1 1 0 1 1 x | 3 | − | 4 | 1 | ↓ | x 1 1 0 1 1 | 3 | − | 2 | 0 |
| | 1 1 1 0 0 x | 1 | + | 2 | 1 | | x 1 1 1 0 0 | 1 | + | 0 | 0 |
| | 1 1 1 0 1 x | 2 | − | 2 | 0 | | x 1 1 1 0 1 | 2 | − | 2 | 1 |
| | 1 1 1 1 0 x | 1 | − | 2 | 1 | | x 1 1 1 1 0 | 1 | − | 0 | 0 |
| ↓ | 1 1 1 1 1 x | 4 | Shift Only | 4 | 0 | ↓ | x 1 1 1 1 1 | 4 | Shift Only | 4 | 1 | x = Don't Care

TABLE 5

Multiplier Decode for Parallel MQ Register without Improvement of Instant Invention.

| PROM BIAS | Bit Pattern Monitored By Decoder Odd Bit | PART. PROD. SHIFT BY | Arith. Oper. | MQ SHIFT BY | PROM BIAS NEXT CYCLE | PROM BIAS | Bit Pattern Monitored By Decoder Odd Bit | PART. PROD. SHIFT BY | Arith. Oper. | MQ SHIFT BY | PROM BIAS NEXT CYCLE |
|---|---|---|---|---|---|---|---|---|---|---|---|
| 0 | 0 0 0 0 0 x | 4 | Shift Only | 4 | 0 | 1 | x 0 0 0 0 0 | 4 | Shift Only | 4 | 1 |
| ↓ | 0 0 0 0 1 x | 1 | + | 2 | 1 | | ~~x 0 0 0 0 1~~ | ~~1~~ | ~~+~~ | ~~0~~ | ~~0~~ |
| | 0 0 0 1 0 x | 2 | + | 2 | 0 | | x 0 0 0 1 0 | 2 | + | 2 | 1 |
| | 0 0 0 1 1 x | 1 | − | 2 | 1 | ↓ | ~~x 0 0 0 1 1~~ | ~~1~~ | ~~−~~ | ~~0~~ | ~~0~~ |
| | 0 0 1 0 0 x | 3 | + | 4 | 1 | | x 0 0 1 0 0 | 3 | + | 2 | 0 |
| | 0 0 1 0 1 x | 1 | + | 2 | 1 | | ~~x 0 0 1 0 1~~ | ~~1~~ | ~~+~~ | ~~0~~ | ~~0~~ |
| | 0 0 1 1 0 x | 2 | − | 2 | 0 | | x 0 0 1 1 0 | 2 | − | 2 | 1 |
| ↓ | 0 0 1 1 1 x | 1 | − | 2 | 1 | ↓ | ~~x 0 0 1 1 1~~ | ~~1~~ | ~~−~~ | ~~0~~ | ~~0~~ |
| | 0 1 0 0 0 x | 4 | + | 4 | 0 | | x 0 1 0 0 0 | 4 | + | 2 | 1 |
| | 0 1 0 0 1 x | 1 | + | 2 | 1 | | ~~x 0 1 0 0 1~~ | ~~1~~ | ~~+~~ | ~~0~~ | ~~0~~ |
| | 0 1 0 1 0 x | 2 | + | 2 | 0 | | x 0 1 0 1 0 | 2 | + | 2 | 1 |
| ↓ | 0 1 0 1 1 x | 1 | − | 2 | 1 | ↓ | ~~x 0 1 0 1 1~~ | ~~1~~ | ~~−~~ | ~~0~~ | ~~0~~ |
| | 1 0 0 1 1 x | 3 | − | 4 | 1 | | x 0 1 1 0 0 | 3 | − | 2 | 0 |
| | 0 1 1 0 1 x | 1 | + | 2 | 1 | | ~~x 0 1 1 0 1~~ | ~~1~~ | ~~+~~ | ~~0~~ | ~~0~~ |
| | 0 1 1 1 0 x | 2 | − | 2 | 0 | | x 0 1 1 1 0 | 2 | − | 2 | 1 |
| ↓ | 0 1 1 1 1 x | 1 | − | 2 | 1 | ↓ | ~~x 0 1 1 1 1~~ | ~~1~~ | ~~−~~ | ~~0~~ | ~~0~~ |
| | 1 0 0 0 0 x | 4 | Shift Only | 4 | 0 | | x 1 0 0 0 0 | 2 | Shift Only | 2 | 1 |
| | 1 0 0 0 1 x | 1 | + | 2 | 1 | | ~~x 1 0 0 0 1~~ | ~~1~~ | ~~+~~ | ~~0~~ | ~~0~~ |
| | 1 0 0 1 0 x | 2 | + | 2 | — | | x 1 0 0 1 0 | 2 | + | 2 | 1 |
| ↓ | 1 0 0 1 1 x | 1 | − | 2 | 1 | ↓ | ~~x 1 0 0 1 1~~ | ~~1~~ | ~~−~~ | ~~0~~ | ~~0~~ |
| | 1 0 1 0 0 x | 3 | + | 4 | 1 | | x 1 0 1 0 0 | 3 | + | 2 | 0 |
| | 1 0 1 0 1 x | 1 | + | 2 | 1 | | ~~x 1 0 1 0 1~~ | ~~1~~ | ~~+~~ | ~~0~~ | ~~0~~ |
| | 1 0 1 1 0 x | 2 | − | 2 | 0 | | x 1 0 1 1 0 | 2 | − | 2 | 1 |
| ↓ | 1 0 1 1 1 x | 1 | − | 2 | 1 | ↓ | ~~x 1 0 x x 1~~ | ~~1~~ | ~~−~~ | ~~0~~ | ~~0~~ |
| | 1 1 0 0 0 x | 4 | − | 4 | 0 | | x 1 1 0 0 0 | 4 | − | 4 | 1 |
| | 1 1 0 0 1 x | 1 | + | 2 | 1 | | ~~x 1 1 0 0 1~~ | ~~1~~ | ~~+~~ | ~~0~~ | ~~0~~ |
| | 1 1 0 1 0 x | 2 | + | 2 | 0 | | x 1 1 0 1 0 | 2 | + | 2 | 1 |
| ↓ | 1 1 0 1 1 x | 1 | − | 2 | 1 | ↓ | ~~x 1 1 0 1 1~~ | ~~1~~ | ~~−~~ | ~~0~~ | ~~0~~ |
| | 1 1 1 0 0 x | 3 | − | 4 | 1 | | x 1 1 1 0 0 | 3 | − | 2 | 0 |
| | 1 1 1 0 1 x | 1 | + | 2 | 1 | | ~~x 1 1 1 0 1~~ | ~~1~~ | ~~+~~ | ~~0~~ | ~~0~~ |
| | 1 1 1 1 0 x | 2 | − | 2 | 0 | | x 1 1 1 1 0 | 2 | − | 2 | 1 |
| ↓ | 1 1 1 1 1 x | 1 | − | 2 | 1 | ↓ | ~~x 1 1 1 1 1~~ | ~~1~~ | ~~−~~ | ~~0~~ | ~~0~~ | x = Don't Care

TABLE 6

Multiplier Decoder for Parallel MQ Register without Improvement of Instant Invention.

| PROM BIAS | Bit Pattern Monitored By Decoder Odd Bit | PART. PROD. SHIFT BY | Arith. Oper. | MQ SHIFT BY | PROM BIAS NEXT CYCLE | PROM BIAS | Bit Pattern Monitored By Decoder Odd Bit | PART. PROD. SHIFT BY | Arith. Oper. | MQ SHIFT BY | PROM BIAS NEXT CYCLE |
|---|---|---|---|---|---|---|---|---|---|---|---|
| 0 | 0 0 0 0 0 x | 1 | + | 2 | 1 | | ~~x 0 0 0 0 0~~ | ~~1~~ | ~~+~~ | ~~0~~ | ~~0~~ |
| | 0 0 0 0 1 x | 2 | + | 2 | 0 | | x 0 0 0 0 1 | 2 | + | 2 | 1 |
| | 0 0 0 1 0 x | 1 | – | 2 | 1 | | ~~x 0 0 0 1 0~~ | ~~1~~ | ~~–~~ | ~~0~~ | ~~0~~ |
| | 0 0 0 1 1 x | 3 | + | 4 | 1 | | x 0 0 0 1 1 | 3 | + | 2 | 0 |
| | 0 0 1 0 0 x | 1 | + | 2 | 1 | | ~~x 0 0 1 0 0~~ | ~~1~~ | ~~+~~ | ~~0~~ | ~~0~~ |
| ↓ | 0 0 1 0 1 x | 2 | – | 2 | 0 | ↓ | x 0 0 1 0 1 | 2 | – | 2 | 1 |
| | 0 0 1 1 0 x | 1 | – | 2 | 1 | | ~~x 0 0 1 1 0~~ | ~~1~~ | ~~–~~ | ~~0~~ | ~~0~~ |
| | 0 0 1 1 1 x | 4 | + | 4 | 0 | | x 0 0 1 1 1 | 4 | + | 2 | 1 |
| | 0 1 0 0 0 x | 1 | + | 2 | 1 | | ~~x 0 1 0 0 0~~ | ~~1~~ | ~~+~~ | ~~0~~ | ~~0~~ |
| | 0 1 0 0 1 x | 2 | + | 2 | 0 | | x 0 1 0 0 1 | 2 | + | 2 | 1 |
| | 0 1 0 1 0 x | 1 | – | 2 | 1 | | ~~x 0 1 0 1 0~~ | ~~1~~ | ~~–~~ | ~~0~~ | ~~0~~ |
| ↓ | 0 1 0 1 1 x | 3 | – | 4 | 1 | ↓ | x 0 1 0 1 1 | 3 | – | 2 | 0 |
| | 1 0 0 1 1 x | 1 | + | 2 | 1 | | ~~x 0 1 1 0 0~~ | ~~1~~ | | ~~0~~ | ~~0~~ |
| | 0 1 1 0 1 x | 2 | – | 2 | 0 | | x 0 1 1 0 1 | 2 | – | 2 | 1 |
| | 0 1 1 1 0 x | 1 | – | 2 | 1 | | ~~x 0 1 1 1 0~~ | ~~1~~ | | ~~0~~ | ~~0~~ |
| | 0 1 1 1 1 x | 4 | Shift Only | 4 | 0 | | x 0 1 1 1 1 | 2 | Shift Only | 2 | 1 |
| | 1 0 0 0 0 x | | | | | | ~~x 1 0 0 0 0~~ | | | | |
| | | 1 | + | 2 | 1 | | | | + | 0 | 0 |
| ↓ | 1 0 0 0 1 x | 2 | + | 2 | – | ↓ | x 1 0 0 0 1 | 2 | + | 2 | 1 |
| | 1 0 0 1 0 x | 1 | – | 2 | 1 | | ~~x 1 0 0 1 0~~ | ~~1~~ | | ~~0~~ | ~~0~~ |
| | 1 0 0 1 1 x | 3 | + | 4 | 1 | | x 1 0 0 1 1 | 3 | + | 2 | 0 |
| | 1 0 1 0 0 x | 1 | + | 2 | 1 | | ~~x 1 0 1 0 0~~ | ~~1~~ | ~~+~~ | ~~0~~ | ~~0~~ |
| | 1 0 1 0 1 x | 2 | – | 2 | 0 | | x 1 0 1 0 1 | 2 | – | 2 | 1 |
| | 1 0 1 1 0 x | 1 | – | 2 | 1 | | ~~x 1 0 1 1 0~~ | ~~1~~ | ~~–~~ | ~~0~~ | ~~0~~ |
| ↓ | 1 0 1 1 1 x | 4 | – | 4 | 0 | ↓ | x 1 0 x x 1 | 4 | – | 4 | 1 |
| | 1 1 0 0 0 x | 1 | + | 2 | 1 | | ~~x 1 1 0 0 0~~ | ~~1~~ | ~~+~~ | ~~0~~ | ~~0~~ |
| | 1 1 0 0 1 x | 2 | + | 2 | 0 | | x 1 1 0 0 1 | 2 | + | 2 | 1 |
| | 1 1 0 1 0 x | 1 | – | 2 | 1 | | ~~x 1 1 0 1 0~~ | ~~1~~ | ~~–~~ | ~~0~~ | ~~0~~ |
| | 1 1 0 1 1 x | 3 | – | 4 | 1 | | x 1 1 0 1 1 | 3 | – | 2 | 0 |
| | 1 1 1 0 0 x | 1 | + | 2 | 1 | | ~~x 1 1 1 0 0~~ | ~~1~~ | ~~+~~ | ~~0~~ | ~~0~~ |
| | 1 1 1 0 1 x | 2 | – | 2 | 0 | | x 1 1 1 0 1 | 2 | – | 2 | 1 |
| | 1 1 1 1 0 x | 1 | – | 2 | 1 | | ~~x 1 1 1 1 0~~ | ~~1~~ | ~~–~~ | ~~0~~ | ~~0~~ |
| ↓ | 1 1 1 1 1 x | 4 | Shift Only | 4 | 0 | ↓ | x 1 1 1 1 1 | 4 | Shift Only | 4 | 1 | x = Don't Care

TABLE 7

| ADDRESS | | | | CONTENT | | | |
|---|---|---|---|---|---|---|---|
| LAST OP (1) | LAST BIAS (2) | MQ Bit Pattern (3) Even Bit | PART. PROD. SHIFT BY (4) | OP (1) | SHIFT BY (5) | MQ (6) SHIFT | NEXT (2) BIAS |
| 0 | 0 | 0 0 0 0 0 | 100 | 1 | 1 | 1 | 0 |
| | | 0 0 0 0 1 | 111 | 1 | 0 | 0 | 1 |
| | | 0 0 0 1 0 | 110 | 1 | 0 | 0 | 0 |
| | | 0 0 0 1 1 | 111 | 0 | 0 | 0 | 1 |
| | | 0 0 1 0 0 | 101 | 1 | 0 | 1 | 1 |
| | | 0 0 1 0 1 | 111 | 1 | 0 | 0 | 1 |
| | | 0 0 1 1 0 | 110 | 1 | 0 | 0 | 0 |
| ↓ | ↓ | 0 0 1 1 1 | 111 | 0 | 0 | 0 | 1 |
| | | 0 1 0 0 0 | 100 | 1 | 0 | 1 | 0 |
| | | 0 1 0 0 1 | 111 | 1 | 0 | 0 | 1 |
| | | 1 1 0 1 0 | 110 | 1 | 0 | 0 | 0 |
| | | 0 1 0 1 1 | 111 | 0 | 0 | 0 | 1 |
| | | 0 1 1 0 0 | 101 | 0 | 0 | 1 | 1 |
| | | 0 1 1 0 1 | 111 | 1 | 0 | 0 | 1 |
| | | 0 1 1 1 0 | 110 | 0 | 0 | 0 | 0 |
| | | 0 1 1 1 1 | 111 | 0 | 0 | 0 | 1 |
| | | 1 0 0 0 0 | 100 | 1 | 1 | 1 | 0 |
| | | 1 0 0 0 1 | 111 | 1 | 0 | 0 | 1 |
| | | 1 0 0 1 0 | 110 | 1 | 0 | 0 | 0 |
| | | 1 0 0 1 1 | 111 | 0 | 0 | 0 | 1 |
| | | 1 0 1 0 0 | 101 | 1 | 0 | 1 | 1 |
| | | 1 0 1 0 1 | 111 | 1 | 0 | 0 | 1 |
| | | 1 0 1 1 0 | 110 | 0 | 0 | 0 | 0 |
| ↓ | ↓ | 1 0 1 1 1 | 111 | 0 | 0 | 0 | 1 |

TABLE 7-continued

| | | | | | | | | | |
|---|---|---|---|---|---|---|---|---|---|
| | | 1 1 0 0 0 | 100 | 0 | 0 | 1 | 0 | | |
| | | 1 1 0 0 1 | 111 | 1 | 0 | 0 | 1 | | |
| | | 1 1 0 1 0 | 110 | 1 | 0 | 0 | 0 | | |
| | | 1 1 0 1 1 | 111 | 0 | 0 | 0 | 1 | | |
| | | 1 1 1 0 0 | 101 | 0 | 0 | 1 | 1 | | |
| | | 1 1 1 0 1 | 111 | 1 | 0 | 0 | 1 | | |
| | | 1 1 1 1 0 | 110 | 0 | 0 | 0 | 0 | | |
| | | 1 1 1 1 1 | 111 | 0 | 0 | 0 | 1 | | |

NOTES:
1. 1 means add (string of zeros).
   0 means subtract (string of ones).
2. 1 means prom biased by one bit (look backward one bit).
3. Five bits are monitored starting on an even bit; "x" means don't care.
4. 100 means right shift by 4 bits;
   101 means right shift by 3 bits;
   110 means right shift by 2 bits;
   111 means right shift by 1 bit.
5. 1 means the arithmetic operation is not carried out. The partial product is shifted in the B register.
6. 1 means MQ reg. shifts 4 bits out.
   0 means MQ reg. shifts 2 bits out.

TABLE 8

ADDRESS | CONTENT

LAST (1) OP | LAST BIAS (2) | MQ Bit Pattern (3) | Even Bit | PART. PROD. SHIFT BY (4) | OP (1) | SHIFT BY (5) | MQ SHIFT (6) | NEXT BIAS (2)

| LAST OP | LAST BIAS | MQ Pattern | Even | PP SHIFT | OP | SHIFT BY | MQ SHIFT | NEXT BIAS |
|---|---|---|---|---|---|---|---|---|
| 1 | 1 | x 0 0 0 0 | | 100 | 1 | 1 | 1 | 1 |
| | | x 0 0 0 1 | | 110 | 1 | 0 | 0 | 0 |
| | | x 0 0 1 0 | | 101 | 1 | 0 | 0 | 0 |
| | | x 0 0 1 1 | | 110 | 0 | 0 | 0 | 1 |
| | | x 0 1 0 0 | | 100 | 1 | 0 | 1 | 1 |
| | | x 0 1 0 1 | | 110 | 1 | 0 | 0 | 0 |
| | | x 0 1 1 0 | | 101 | 0 | 0 | 0 | 1 |
| | | x 0 1 1 1 | | 110 | 0 | 0 | 0 | 1 |
| | | x 1 0 0 0 | | 110 | 1 | 1 | 0 | 1 |
| | | x 1 0 0 1 | | 110 | 1 | 0 | 0 | 1 |
| | | x 1 0 1 0 | | 101 | 1 | 0 | 0 | 0 |
| | | x 1 0 1 1 | | 110 | 0 | 0 | 0 | 1 |
| | | x 1 1 0 0 | | 100 | 0 | 0 | 1 | 1 |
| | | x 1 1 0 1 | | 110 | 1 | 0 | 0 | 1 |
| | | x 1 1 1 0 | | 101 | 0 | 0 | 0 | 0 |
| | | x 1 1 1 1 | | 110 | 0 | 0 | 0 | 1 |

NOTES:
1. 1 means add (string of zeros). 0 means subtract (string of ones).
2. 1 means prom biased by one bit (look backward one bit).
3. Five bits are monitored starting on an even bit; "x" means don't care.
4. 100 means right shift by 4 bits; 101 means right shift by 3 bits; 110 means right shift by 2 bits; 111 means right shift by 1 bit.
5. 1 means the arithmetic operation is not carried out. The partial product is shifted in the B register.
6. 1 means MQ reg. shifts 4 bits out. 0 means MQ reg. shifts 2 bits out.

TABLE 9

ADDRESS | CONTENT

LAST OP (1) | LAST BIAS (2) | MQ Bit Pattern (3) | Even Bit | PART. PROD. SHIFT BY (4) | OP (1) | SHIFT BY (5) | MQ SHIFT (6) | NEXT BIAS (2)

| LAST OP | LAST BIAS | MQ Pattern | PP SHIFT | OP | SHIFT BY | MQ SHIFT | NEXT BIAS |
|---|---|---|---|---|---|---|---|
| 0 | 0 | 0 0 0 0 0 | 111 | 1 | 0 | 0 | 1 |
| | | 0 0 0 0 1 | 110 | 1 | 0 | 0 | 0 |
| | | 0 0 0 1 0 | 111 | 0 | 0 | 0 | 1 |
| | | 0 0 0 1 1 | 101 | 1 | 0 | 1 | 1 |
| | | 0 0 1 0 0 | 111 | 1 | 0 | 0 | 1 |
| | | 0 0 1 0 1 | 110 | 0 | 0 | 0 | 0 |
| | | 0 0 1 1 0 | 111 | 0 | 0 | 0 | 1 |
| | | 0 0 1 1 1 | 100 | 1 | 0 | 1 | 0 |
| | | 0 1 0 0 0 | 111 | 1 | 0 | 0 | 1 |
| | | 0 1 0 0 1 | 110 | 1 | 0 | 0 | 0 |
| | | 0 1 0 1 0 | 111 | 0 | 0 | 0 | 1 |
| | | 0 1 0 1 1 | 101 | 0 | 0 | 1 | 1 |
| | | 0 1 1 0 0 | 111 | 1 | 0 | 0 | 1 |
| | | 0 1 1 0 1 | 110 | 0 | 0 | 0 | 0 |
| | | 0 1 1 1 0 | 111 | 0 | 0 | 0 | 1 |
| | | 0 1 1 1 1 | 100 | 1 | 1 | 1 | 0 |
| | | 1 0 0 0 0 | 111 | 1 | 0 | 0 | 1 |
| | | 1 0 0 0 1 | 110 | 1 | 0 | 0 | 0 |
| | | 1 0 0 1 0 | 111 | 0 | 0 | 0 | 1 |
| | | 1 0 0 1 1 | 101 | 1 | 0 | 1 | 1 |
| | | 1 0 1 0 0 | 111 | 1 | 0 | 0 | 1 |
| | | 1 0 1 0 1 | 111 | 0 | 0 | 0 | 0 |
| | | 1 0 1 1 0 | 111 | 0 | 0 | 0 | 1 |
| | | 1 0 1 1 1 | 100 | 0 | 0 | 1 | 0 |
| | | 1 1 0 0 0 | 111 | 1 | 0 | 0 | 1 |
| | | 1 1 0 0 1 | 110 | 1 | 0 | 0 | 0 |
| | | 1 1 0 1 0 | 111 | 0 | 0 | 0 | 1 |
| | | 1 1 0 1 1 | 101 | 0 | 0 | 1 | 1 |
| | | 1 1 1 0 0 | 111 | 1 | 0 | 0 | 1 |
| | | 1 1 1 0 1 | 110 | 0 | 0 | 0 | 0 |
| | | 1 1 1 1 0 | 111 | 0 | 0 | 0 | 1 |
| | | 1 1 1 1 1 | 100 | 1 | 1 | 1 | 0 |

NOTES:
1. 1 means add (string of zeros).
   0 means subtract (string of ones).
2. 1 means prom biased by one bit (look backward one bit).
3. Five bits are monitored starting on an even bit; "x" means don't care.
4. 100 means right shift by 4 bits;
   101 means right shift by 3 bits;
   110 means right shift by 2 bits;
   111 means right shift by 1 bit.
5. 1 means the arithmetic operation is not carried out. The partial product is shifted in the B register.
6. 1 means MQ reg. shifts 4 bits out.
   0 means MQ reg. shifts 2 bits out.

TABLE 10

ADDRESS | CONTENT

LAST (1) OP | LAST BIAS (2) | MQ Bit Pattern (3) | Even Bit | PART. PROD. SHIFT BY (4) | OP (1) | SHIFT BY (5) | MQ SHIFT (6) | NEXT BIAS (2)

| LAST OP | LAST BIAS | MQ Pattern | PP SHIFT | OP | SHIFT BY | MQ SHIFT | NEXT BIAS |
|---|---|---|---|---|---|---|---|
| 1 | 1 | x 0 0 0 0 | 110 | 1 | 0 | 0 | 1 |
| | | x 0 0 0 1 | 101 | 1 | 0 | 0 | 0 |
| | | x 0 0 1 0 | 110 | 0 | 0 | 0 | 1 |
| | | x 0 0 1 1 | 100 | 1 | 0 | 1 | 1 |
| | | x 0 1 0 0 | 110 | 1 | 0 | 0 | 1 |
| | | x 0 1 0 1 | 101 | 0 | 0 | 0 | 0 |
| | | x 0 1 1 0 | 110 | 0 | 0 | 0 | 1 |
| | | x 0 1 1 1 | 110 | 1 | 1 | 0 | 1 |

TABLE 10-continued

|   |   |           |     |   |   |   |   |
|---|---|-----------|-----|---|---|---|---|
|   |   | x 1 0 0 0 | 110 | 1 | 0 | 0 | 1 |
|   |   | x 1 0 0 1 | 101 | 1 | 0 | 0 | 0 |
|   |   | x 1 0 1 0 | 110 | 0 | 0 | 0 | 1 |
|   |   | x 1 0 1 1 | 100 | 0 | 0 | 1 | 1 |
|   |   | x 1 1 0 0 | 110 | 1 | 0 | 0 | 1 |
|   |   | x 1 1 0 1 | 101 | 0 | 0 | 0 | 0 |
|   |   | x 1 1 1 0 | 110 | 0 | 0 | 0 | 1 |
| ↓ | ↓ | x 1 1 1 1 | 100 | 1 | 1 | 1 | 1 |

NOTES:
1. 1 means add (string of zeros).
   0 means subtract (string of ones).
2. 1 means prom biased by one bit (look backward one bit).
3. Five bits are monitored starting on an even bit; "x" means don't care.
4. 100 means right shift by 4 bits;
   101 means right shift by 3 bits;
   110 means right shift by 2 bits;
   111 means right shift by 1 bit.
5. 1 means the arithmetic operation is not carried out. The partial product is shifted in the B register.
6. 1 means MQ reg. shifts 4 bits out.
   0 means MQ reg. shifts 2 bits out.

Having thus described a preferred embodiment invention, what is claimed is:

1. A floating point processor (FPP) architecture which permits multiple bit shifting, comprising,
   first register means for storing a multiplier signal,
   decoder means connected to receive signals from said first register means,
   arithmetic logic circuit means connected to receive signals from and supply signals to said decoder means,
   second and third register means connected to supply signals to and receive signals from said arithmetic logic circuit means, and
   source means for supplying signals to and receiving signals from said first and second register means.

2. The FPP architecture recited in claim 1 wherein, said first register means is arranged in parallel thereby to produce at least two output signals concurrently.

3. The FPP architecture recited in claim 2 including, latch means connected between said first register means and said decoder means to permit serial output by said first register means.

4. The FPP architecture recited in claim 3 wherein, said decoder means receives at least two signal bits from said latch means and at least one signal bit from said first register means in order to decode a series condition represented by the signal bits presented to said decoder means and to control the arithmetic logic circuit means as a result thereof.

5. The FPP architecture recited in claim 1 wherein, said decoder means includes PROM means the contents of which determines the operation of said arithmetic logic circuit means.

6. The FPP architecture recited in claim 5 wherein, said decoder means includes prealign decoder means for aligning the floating point processor number as a function of the exponent portion thereof.

7. The FPP architecture recited in claim 5 wherein, the contents of said PROM means is selected by an address which includes the signals supplied by said first register means.

8. The FPP architecture recited in claim 5 wherein, the contents of said PROM means incorporates a unique code wherein certain code arrangements can be eliminated thereby to reduce the size of said PROM means.

9. The FPP architecture recited in claim 1 including, shift means connected to control the operation of said arithmetic logic circuit means.

10. The FPP architecture recited in claim 9 wherein, said shift means receives signals from said decoder means and from said third register means.

11. The FPP architecture recited in claim 9 wherein, said decoder means includes shift control means to control the left or right shift operation of the shift means.

12. The FPP architecture recited in claim 9 wherein, said shift means includes a combinational shifter connected from said third register means to said arithmetic logic circuit means.

13. The FPP architecture recited in claim 1 wherein, said second and third register means store the multiplicand and partial product signals, respectively.

14. The FPP architecture recited in claim 1 wherein, said source means supplies signals representative of a floating point number only when an FPP load operation is selected.

15. The FPP architecture recited in claim 1 wherein, said decoder means operates upon the signals received from said first register means to produce code signals which control the operation of said arithmetic logic circuit means in terms of signal shifts and additions or subtractions to be performed by said arithmetic logic circuit on the signals received from said second and third registers.

16. The FPP architecture recited in claim 1 wherein, said multiplier signal comprises a plurality of binary ones and zeroes,
   said decoder means examines said multiplier signal and produces output signals as a function of the pattern of said binary ones and zeroes in said multiplier signal, and
   said arithmetic logic circuit means selectively adds or subtracts the multiplicand signal stored in said third register means in response to the output signal produced by said decoder means.

17. The FPP architecture recited in claim 16 wherein, said decoder means detects a string of binary ones, or a string of binary zeroes, or an isolated binary zero, or an isolated binary one and produces an output signal representative thereof.

* * * * *